United States Patent
Lee et al.

(10) Patent No.: US 11,416,495 B2
(45) Date of Patent: Aug. 16, 2022

(54) NEAR-ZERO DOWNTIME RELOCATION OF A PLUGGABLE DATABASE ACROSS CONTAINER DATABASES

(71) Applicant: Oracle International Corporation, Redwood Shores, CA (US)

(72) Inventors: Jaebock Lee, Sunnyvale, CA (US); Kumar Rajamani, San Ramon, CA (US); Sanket Jain, Sunnyvale, CA (US); Giridhar Ravipati, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/090,732

(22) Filed: Nov. 5, 2020

(65) Prior Publication Data

US 2021/0056123 A1     Feb. 25, 2021

Related U.S. Application Data

(62) Division of application No. 15/215,446, filed on Jul. 20, 2016, now Pat. No. 10,860,605.

(Continued)

(51) Int. Cl.
*G06F 16/00*      (2019.01)
*G06F 16/2455*   (2019.01)
(Continued)

(52) U.S. Cl.
CPC ...... *G06F 16/24566* (2019.01); *G06F 16/119* (2019.01); *G06F 16/13* (2019.01);
(Continued)

(58) Field of Classification Search
CPC ...... G06F 16/119; G06F 16/13; G06F 16/172; G06F 16/178; G06F 16/214;
(Continued)

(56) References Cited

U.S. PATENT DOCUMENTS

| | | | |
|---|---|---|---|
| 6,185,699 | B1 | 2/2001 | Haderle |
| 6,205,449 | B1 | 3/2001 | Rastogi |

(Continued)

FOREIGN PATENT DOCUMENTS

CN        104951425 A      9/2015

OTHER PUBLICATIONS

Susairaj, U.S. Appl. No. 15/266,340, filed Sep. 15, 2016, Notice of Allowance, dated May 7, 2021.

(Continued)

*Primary Examiner* — Michelle N Owyang
(74) *Attorney, Agent, or Firm* — Hickman Becker Bingham Ledesma LLP

(57) ABSTRACT

Embodiments minimize downtime involved in moving a PDB between CDBs by allowing read-write access to the PDB through most of the moving operation, and by transparently forwarding connection requests, for the PDB, from the source CDB to the destination CDB. The files of a source PDB are copied from a source CDB to a destination CDB, during which the source PDB may be in read-write mode. The source PDB is then closed to write operations so that changes to the source PDB cease. Another round of recovery is performed on the PDB clone, which applies all changes that have been performed on the source PDB during the copy operation and the PDB clone is opened for read and write operations. Forwarding information is registered with the source location, which information is used to automatically forward connection requests, received at the source location for the moved PDB, to the destination location.

14 Claims, 10 Drawing Sheets

Related U.S. Application Data

(60) Provisional application No. 62/245,937, filed on Oct. 23, 2015.

(51) Int. Cl.

| | | |
|---|---|---|
| *G06F 16/172* | (2019.01) | |
| *G06F 16/25* | (2019.01) | |
| *G06F 16/21* | (2019.01) | |
| *G06F 16/27* | (2019.01) | |
| *G06F 16/11* | (2019.01) | |
| *G06F 16/178* | (2019.01) | |
| *G06F 16/23* | (2019.01) | |
| *G06F 16/13* | (2019.01) | |

(52) U.S. Cl.
CPC .......... *G06F 16/172* (2019.01); *G06F 16/178* (2019.01); *G06F 16/214* (2019.01); *G06F 16/2358* (2019.01); *G06F 16/2365* (2019.01); *G06F 16/258* (2019.01); *G06F 16/27* (2019.01); *G06F 16/273* (2019.01)

(58) Field of Classification Search
CPC ............. G06F 16/2358; G06F 16/2365; G06F 16/24566; G06F 16/258; G06F 16/27; G06F 16/273
USPC .................................................. 707/600–899
See application file for complete search history.

(56) References Cited

U.S. PATENT DOCUMENTS

| | | | |
|---|---|---|---|
| 6,226,650 B1 | 5/2001 | Mahajan | |
| 6,295,610 B1 | 9/2001 | Ganesh | |
| 6,502,102 B1 | 12/2002 | Haswell | |
| 6,638,878 B2 | 10/2003 | Restaino | |
| 6,804,671 B1 | 10/2004 | Loaiza et al. | |
| 6,973,647 B2 | 12/2005 | Crudele | |
| 6,983,295 B1 | 1/2006 | Hart | |
| 7,136,857 B2 | 11/2006 | Chen | |
| 7,305,421 B2 | 12/2007 | Cha | |
| 7,346,635 B2* | 3/2008 | Whitten ................ G06F 16/214 | |
| 7,366,713 B2 | 4/2008 | Kaluskar | |
| 7,406,515 B1 | 7/2008 | Joyce | |
| 7,418,435 B1 | 8/2008 | Sedlar | |
| 7,571,173 B2 | 8/2009 | Yang | |
| 7,620,620 B1 | 11/2009 | Sedlar | |
| 7,620,623 B2 | 11/2009 | Sedlar | |
| 7,634,477 B2 | 12/2009 | Hinshaw | |
| 7,822,717 B2 | 10/2010 | Kapoor | |
| 8,061,085 B2 | 11/2011 | Anderson | |
| 8,065,320 B2 | 11/2011 | Sedlar | |
| 8,117,174 B2 | 2/2012 | Shaughessey | |
| 8,161,085 B2 | 4/2012 | Souder | |
| 8,364,648 B1 | 1/2013 | Sim-Tang | |
| 8,478,718 B1 | 7/2013 | Ranade | |
| 8,554,762 B1 | 10/2013 | O'Neill | |
| 8,756,197 B1 | 6/2014 | Wilde | |
| 8,805,849 B1 | 8/2014 | Christensen | |
| 9,026,679 B1 | 5/2015 | Shmuylovich | |
| 9,280,591 B1 | 3/2016 | Kharatishvili | |
| 9,298,564 B2 | 3/2016 | Lee | |
| 9,390,120 B1 | 7/2016 | Gulliver | |
| 9,396,220 B2 | 7/2016 | Li | |
| 9,507,843 B1 | 11/2016 | Madhavarapu | |
| 9,684,561 B1 | 6/2017 | Yan | |
| 9,817,836 B2 | 11/2017 | Zha | |
| 9,940,203 B1 | 4/2018 | Ghatnekar | |
| 10,348,565 B2 | 7/2019 | Kannan et al. | |
| 10,484,297 B1* | 11/2019 | McClenahan ........... H04L 67/34 | |
| 2002/0112022 A1 | 8/2002 | Kazar et al. | |
| 2002/0143733 A1 | 10/2002 | Mukkamalla | |
| 2003/0050932 A1 | 3/2003 | Pace | |
| 2003/0061537 A1 | 3/2003 | Cha et al. | |
| 2003/0074360 A1 | 4/2003 | Chen | |
| 2003/0154236 A1 | 8/2003 | Dar | |
| 2004/0024888 A1 | 2/2004 | Davis | |
| 2004/0039962 A1 | 2/2004 | Ganesh | |
| 2004/0054643 A1 | 3/2004 | Vermuri | |
| 2004/0054644 A1 | 3/2004 | Ganesh | |
| 2004/0177099 A1 | 9/2004 | Ganesh | |
| 2004/0186826 A1 | 9/2004 | Choi | |
| 2004/0210577 A1 | 10/2004 | Kundu | |
| 2004/0267809 A1 | 12/2004 | East et al. | |
| 2005/0038831 A1 | 2/2005 | Souder et al. | |
| 2005/0234936 A1 | 10/2005 | Castro | |
| 2005/0256908 A1* | 11/2005 | Yang .................... G06F 16/258 | |
| 2005/0283478 A1 | 12/2005 | Choi | |
| 2005/0289213 A1 | 12/2005 | Newport | |
| 2006/0047626 A1 | 3/2006 | Raheem | |
| 2006/0047713 A1 | 3/2006 | Gornshtein | |
| 2006/0179042 A1 | 8/2006 | Bram | |
| 2006/0206489 A1 | 9/2006 | Finnie | |
| 2007/0083563 A1 | 4/2007 | Souder | |
| 2007/0100912 A1 | 5/2007 | Pareek et al. | |
| 2007/0244918 A1 | 10/2007 | Lee | |
| 2008/0016123 A1 | 1/2008 | Devraj et al. | |
| 2008/0208820 A1 | 8/2008 | Usey | |
| 2009/0282203 A1 | 11/2009 | Haustein | |
| 2010/0211756 A1 | 8/2010 | Kaminski | |
| 2010/0318570 A1 | 12/2010 | Narasinghanallur et al. | |
| 2011/0004586 A1 | 1/2011 | Cherryholmes et al. | |
| 2011/0047555 A1 | 2/2011 | Lakshmanan | |
| 2011/0060724 A1 | 3/2011 | Chan | |
| 2011/0087633 A1 | 4/2011 | Kreuder | |
| 2011/0307450 A1 | 12/2011 | Hahn et al. | |
| 2012/0109926 A1 | 5/2012 | Noik et al. | |
| 2012/0173717 A1 | 7/2012 | Kohli | |
| 2012/0180070 A1* | 7/2012 | Pafumi .................... G06F 9/542 | |
| | | | 719/318 |
| 2012/0259815 A1 | 10/2012 | Olson | |
| 2012/0284228 A1 | 11/2012 | Ghosh | |
| 2012/0284544 A1 | 11/2012 | Xian | |
| 2012/0287282 A1 | 11/2012 | Kinoshita | |
| 2012/0323849 A1 | 12/2012 | Garin | |
| 2013/0085742 A1 | 4/2013 | Baker et al. | |
| 2013/0085998 A1 | 4/2013 | Barker | |
| 2013/0117237 A1 | 5/2013 | Thomsen et al. | |
| 2013/0166504 A1* | 6/2013 | Varkhedi ............... G06F 16/275 | |
| | | | 707/610 |
| 2013/0198133 A1 | 8/2013 | Lee | |
| 2013/0212068 A1 | 8/2013 | Talius et al. | |
| 2014/0019387 A1* | 1/2014 | Cao ....................... G06F 16/214 | |
| | | | 706/12 |
| 2014/0033220 A1 | 1/2014 | Campbell | |
| 2014/0095452 A1 | 4/2014 | Lee et al. | |
| 2014/0095530 A1 | 4/2014 | Lee et al. | |
| 2014/0095546 A1 | 4/2014 | Kruglikov et al. | |
| 2014/0164331 A1 | 6/2014 | Li et al. | |
| 2014/0188804 A1 | 7/2014 | Gokhale | |
| 2014/0258241 A1 | 9/2014 | Chen | |
| 2015/0032694 A1 | 1/2015 | Rajamani et al. | |
| 2015/0120659 A1 | 4/2015 | Srivastava | |
| 2015/0120780 A1 | 4/2015 | Jain | |
| 2015/0134626 A1 | 5/2015 | Theimer | |
| 2015/0254240 A1 | 9/2015 | Li et al. | |
| 2015/0370641 A1 | 12/2015 | Susairaj | |
| 2016/0014038 A1 | 1/2016 | Thyagarajan | |
| 2016/0117779 A1 | 4/2016 | Sale | |
| 2016/0170978 A1 | 6/2016 | Michael et al. | |
| 2016/0188621 A1 | 6/2016 | Karinta et al. | |
| 2016/0352836 A1 | 12/2016 | Kamalakantha | |
| 2017/0048314 A1 | 2/2017 | Aerdts | |
| 2017/0116207 A1 | 4/2017 | Lee | |
| 2017/0116213 A1 | 4/2017 | Jain | |
| 2017/0116249 A1 | 4/2017 | Ravipati | |
| 2017/0116298 A1 | 4/2017 | Ravipati | |
| 2017/0220271 A1 | 8/2017 | Muthukrishnan | |
| 2017/0315877 A1 | 11/2017 | Kaplingat | |
| 2017/0357550 A1 | 12/2017 | Jain | |
| 2018/0060177 A1 | 3/2018 | Shanthaveerappa | |
| 2018/0060181 A1 | 3/2018 | Rajamani | |
| 2018/0075041 A1 | 3/2018 | Susairaj | |
| 2018/0075044 A1 | 3/2018 | Kruglikov | |

(56) References Cited

U.S. PATENT DOCUMENTS

| | | |
|---|---|---|
| 2018/0075086 A1 | 3/2018 | Yam |
| 2018/0096252 A1 | 4/2018 | Fagundes |
| 2018/0107711 A1 | 4/2018 | Tariq |
| 2019/0102411 A1 | 4/2019 | Hung et al. |
| 2020/0387575 A1* | 12/2020 | Palekar ................. G06F 16/178 |

OTHER PUBLICATIONS

Muthukrishnan, U.S. Appl. No. 15/012,621, filed Feb. 1, 2016, Notice of Allowance, dated Jun. 28, 2021.

Susairaj, U.S. Appl. No. 15/266,340, filed Sep. 15, 2016, Notice of Allowance and Fees Due, dated May 25, 2021.

Muthukrishnan, U.S. Appl. No. 15/012,621, filed Feb. 1, 2016, Notice of Allowance and Fees Due, dated Jul. 13, 2021.

Hung, U.S. Appl. No. 16/135,769, filed Sep. 19, 2018, Advisory Action, dated Aug. 11, 2021.

Muthukrishnan, U.S. Appl. No. 15/012,621, filed Feb. 1, 2016, Office Action, dated Jan. 24, 2020.

Lee, U.S. Appl. No. 15/215,446, filed Jul. 20, 2016, Office Action, dated May 8, 2020.

Michael, U.S. Appl. No. 14/571,008, filed Dec. 15, 2014, Corrected Notice of Allowability, dated Dec. 19, 2018.

Michael, U.S. Appl. No. 14/571,008, filed Dec. 15, 2014, Final Office Action, dated Apr. 27, 2018.

Michael, U.S. Appl. No. 14/571,008, filed Dec. 15, 2014, Interview Summary, dated Feb. 23, 2018.

Michael, U.S. Appl. No. 14/571,008, filed Dec. 15, 2014, Interview Summary, dated Mar. 17, 2017.

Michael, U.S. Appl. No. 14/571,008, filed Dec. 15, 2014, Notice of Allowance, dated Sep. 12, 2018.

Michael, U.S. Appl. No. 14/571,008, filed Dec. 15, 2014, Office Action, dated Nov. 22, 2017.

Michael, U.S. Appl. No. 14/571,008, filed Dec. 15, 2014, Office Action, dated Dec. 28, 2016.

Hung, U.S. Appl. No. 16/135,769, filed Sep. 19, 2018, Final Office Action, dated Jul. 7, 2020.

Muthukrishnan, U.S. Appl. No. 15/012,621, filed Feb. 1, 2016, Final Office Action, dated Jul. 24, 2020.

Lee, U.S. Appl. No. 15/215,446, filed Jul. 20, 2019, Final Office Action, dated Dec. 4, 2019.

Muthukrishnan, U.S. Appl. No. 15/012,621, filed Feb. 1, 2016, Office Action, dated Oct. 4, 2018.

Muthukrishnan, U.S. Appl. No. 15/012,6221, filed Feb. 1, 2016, Interview Summary, dated Jul. 29, 2019.

Rajamani, U.S. Appl. No. 15/254,884, filed Sep. 1, 2016, Final Office Action, dated Nov. 21, 2018.

Rajamani, U.S. Appl. No. 15/254,884, filed Sep. 1, 2016, Interview Summary, dated Sep. 24, 2018.

Rajamani, U.S. Appl. No. 15/254,884, filed Sep. 1, 2016, Interview Summary, dated Jan. 10, 2019.

Rajamani, U.S. Appl. No. 15/254,884, filed Sep. 1, 2016, Notice of Allowance, dated Jun. 24, 2020.

Rajamani, U.S. Appl. No. 15/254,884, filed Sep. 1, 2016, Notice of Allowance, dated Nov. 20, 2019.

Rajamani, U.S. Appl. No. 15/254,884, filed Sep. 1, 2016, Office Action, dated Jun. 27, 2018.

Ravipati, U.S. Appl. No. 15/215,435, filed Jul. 20, 2016, Interview Summary, dated Jan. 15, 2020.

Muthukrishnan, U.S. Appl. No. 15/012,621, filed Feb. 1, 2016, Final Office Action, dated Apr. 4, 2019.

Lee, U.S. Appl. No. 15/215,446, filed Jul. 20, 2016, Advisory Action, dated Jun. 4, 2019.

Hung, U.S. Appl. No. 16/135,769, filed Sep. 19, 2018, Office Action, dated Mar. 12, 2020.

Jain, U.S. Appl. No. 15/093,506, filed Apr. 7, 2016, Final Office Action, dated Oct. 28, 2019.

Jain, U.S. Appl. No. 15/093,506, filed Apr. 7, 2016, Interview Summary, dated Jul. 8, 2019.

Jain, U.S. Appl. No. 15/093,506, filed Apr. 7, 2016, Notice of Allowance, dated Jan. 6, 2020.

Jain, U.S. Appl. No. 15/093,506, filed Apr. 7, 2016, Office Action, dated Mar. 20, 2019.

Krugikov, U.S. Appl. No. 15/266,902, filed Sep. 15, 2016, Final Office Action, dated Jan. 31, 2019.

Krugikov, U.S. Appl. No. 15/266,902, filed Sep. 15, 2016, Interview Summary, dated Feb. 20, 2019.

Krugikov, U.S. Appl. No. 15/266,902, filed Sep. 15, 2016, Notice of Allowance, dated Nov. 2, 2019.

Kruglikov, U.S. Appl. No. 15/266,902, filed Sep. 15, 2016, Interview Summary, dated Oct. 1, 2018.

Lee, U.S. Appl. No. 15/215,446, filed Jul. 20, 2016, Notice of Allowance, dated Aug. 21, 2020.

Lee, U.S. Appl. No. 15/215,446, filed Jul. 20, 2016, Advisory Action, dated Jan. 24, 2020.

Lee, U.S. Appl. No. 15/215,446, filed Jul. 20, 2020, Interview Summary, dated Aug. 11, 2020.

Lee, U.S. Appl. No. 15/215,446, filed Jul. 20, 2016, Final Office Action, dated Mar. 12, 2019.

Lee, U.S. Appl. No. 15/215,446, filed Jul. 20, 2016, Interview Summary, dated Jan. 15, 2020.

Lee, U.S. Appl. No. 15/215,446, filed Jul. 20, 2016, Interview Summary, dated May 3, 2019.

Lee, U.S. Appl. No. 15/215,446, filed Jul. 20, 2016, Interview Summary, dated Sep. 10, 2019.

Lee, U.S. Appl. No. 15/215,446, filed Jul. 20, 2016, Office Action, dated Jul. 17, 2019.

Lee, U.S. Appl. No. 15/215,446, filed Jul. 20, 2016, Office Action, dated Nov. 16, 2018.

Lee, U.S. Appl. No. 15/215,446, filed Jul. 20, 2016, Restrcition Requirement, dated Oct. 1, 2018.

Ravipati, U.S. Appl. No. 15/215,435, filed Jul. 20, 2016, Final Office Action, dated Dec. 4, 2019.

Kruglikov, U.S. Appl. No. 15/266,902, filed Sep. 15, 2016, Office Action, dated Aug. 6, 2018.

U.S. Appl. No. 13/631,815, filed Sep. 28, 2012, Office Action, dated Dec. 23, 2013.

Ravipati, U.S. Appl. No. 15/215,435, filed Jul. 20, 2016, Advisory Action, dated Jan. 24, 2020.

Shanthaveerappa, U.S. Appl. No. 15/244,867, filed Aug. 23, 2016, Interview Summary, dated Mar. 14, 2019.

Shanthaveerappa, U.S. Appl. No. 15/244,867, filed Aug. 23, 2016, Notice of Allowance, dated Apr. 4, 2019.

Shanthaveerappa, U.S. Appl. No. 15/244,867, filed Aug. 23, 2016, Notice of Allowance, dated Nov. 5, 2019.

Shanthaveerappa, U.S. Appl. No. 15/244,867, filed Aug. 23, 2016, Office Action, dated Jun. 28, 2018.

Susairaj, U.S. Appl. No. 15/226,340, filed Sep. 15, 2016, Office Action, dated Oct. 30, 2018.

Susairaj, U.S. Appl. No. 15/266,340, filed Sep. 15, 2016, Final Office Action, dated Mar. 26, 2019.

Susairaj, U.S. Appl. No. 15/266,340, filed Sep. 15, 2016, Interview Summary, dated Jan. 3, 2019.

Shanthaveerappa, U.S. Appl. No. 15/244,867, filed Aug. 23, 2016, Interview Summary, dated Oct. 30, 2018.

U.S. Appl. No. 13/631,815, filed Sep. 28, 2012, Office Action, dated May 29, 2014.

Ravipati, U.S. Appl. No. 15/215,443, filed Jul. 20, 2016, Office Action, dated May 6, 2020.

U.S. Appl. No. 13/631,815, filed Sep. 8, 2012, Notice of Allowance, dated Apr. 3, 2015.

U.S. Appl. No. 13/631,815, filed Sep. 28, 2012, Notice of Allowance, dated Aug. 20, 2015.

U.S. Appl. No. 13/631,815, filed Sep. 28, 2012, Office Action, dated Nov. 6, 2014.

U.S. Appl. No. 14/202,091, filed Mar. 10, 2014, Notice of Allowance, dated Feb. 26, 2016.

Yam, U.S. Appl. No. 15/266,917, filed Sep. 15, 2016, Office Action, dated Jun. 21, 2019.

Yam, U.S. Appl. No. 15/266,917, filed Sep. 15, 2016, Final Office Action, dated Feb. 4, 2019.

(56) References Cited

OTHER PUBLICATIONS

Yam, U.S. Appl. No. 15/266,917, filed Sep. 15, 2016, Interview Summary, dated Mar. 1, 2019.
Yam, U.S. Appl. No. 15/266,917, filed Sep. 15, 2016, Interview Summary, dated Oct. 19, 2018.
Yam, U.S. Appl. No. 15/266,917, filed Sep. 15, 2016, Notice of Allowance, dated Jan. 6, 2020.
Susairaj, U.S. Appl. No. 15/266,340, filed Sep. 15, 2016, Interview Summary, dated Apr. 24, 2019.
Ravipati, U.S. Appl. No. 15/215,443, filed Jul. 20, 2016, Advisory Action, dated Jun. 5, 2019.
Yam, U.S. Appl. No. 15/266,917, filed Sep. 15, 2016, Advisory Action, dated Apr. 29, 2019.
Ravipati, U.S. Appl. No. 15/215,435, filed Jul. 20, 2016, Interview Summary, dated Jan. 4, 2019.
Ravipati, U.S. Appl. No. 15/215,435, filed Jul. 20, 2016, Interview Summary, dated May 3, 2019.
Ravipati, U.S. Appl. No. 15/215,435, filed Jul. 20, 2016, Interview Summary, dated Aug. 11, 2020.
Ravipati, U.S. Appl. No. 15/215,435, filed Jul. 20, 2016, Interview Summary, dated Sep. 10, 2019.
Ravipati, U.S. Appl. No. 15/215,435, filed Jul. 20, 2016, Office Action, dated Jul. 18, 2019.
Ravipati, U.S. Appl. No. 15/215,435, filed Jul. 20, 2016, Office Action, dated Sep. 19, 2018.
Ravipati, U.S. Appl. No. 15/215,435, filed Jul. 20, 2019, Advisory Action, dated Jun. 5, 2019.
Ravipati, U.S. Appl. No. 15/215,435, filed Jul. 20, 2016, Office Action, dated May 6, 2020.
Shanthaveerappa, U.S. Appl. No. 15/244,867, filed Aug. 23, 2016, Final Office Action, dated Jan. 24, 2019.
Ravipati, U.S. Appl. No. 15/215,443, filed Jul. 20, 2016, Advisory Action, dated Jan. 24, 2020.
Ravipati, U.S. Appl. No. 15/215,435, filed Jul. 20, 2016, Final Office Action, dated Mar. 14, 2019.
Ravipati, U.S. Appl. No. 15/215,443, filed Jul. 20, 2016, Final Office Action, dated Mar. 11, 2019.
Ravipati, U.S. Appl. No. 15/215,443, filed Jul. 20, 2016, Interview Summary, dated Jan. 4, 2019.
Ravipati, U.S. Appl. No. 15/215,443, filed Jul. 20, 2016, Interview Summary, dated May 3, 2019.
Ravipati, U.S. Appl. No. 15/215,443, filed Jul. 20, 2016, Interview Summary, dated Aug. 11, 2020.
Ravipati, U.S. Appl. No. 15/215,443, filed Jul. 20, 2016, Interview Summary, dated Sep. 10, 2019.
Ravipati, U.S. Appl. No. 15/215,443, filed Jul. 20, 2016, Interview Summary, dated Jan. 15, 2020.
Ravipati, U.S. Appl. No. 15/215,443, filed Jul. 20, 2016, Office Action, dated Sep. 19, 2018.
Ravipati, U.S. Appl. No. 15/215,443, filed Jul. 20, 2016, Final Office Action, dated Dec. 4, 2019.
Ravipati, U.S. Appl. No. 15/215,443, filed Jul. 20, 2016, Office Action, dated Jul. 18, 2019.
Susairaj, U.S. Appl. No. 15/266,340, filed Sep. 15, 2016, Office Action, dated Nov. 20, 2020.
Ravipati, U.S. Appl. No. 15/215,443, filed Jul. 20, 2016, Notice of Allowance, dated Oct. 15, 2020.
Ravipati, U.S. Appl. No. 15/215,435, filed Jul. 20, 2016, Notice of Allowance, dated Oct. 15, 2020.
Muthukrishnan, U.S. Appl. No. 15/012,621, filed Feb. 1, 2016, Corrected Notice of Allowability, dated Oct. 8, 2021.
Hung, U.S. Appl. No. 16/135,769, filed Sep. 19, 2018, Notice of Allowance and Fees Due, dated Oct. 20, 2021.
Muhammad Anwar, "How to Install Oracle 12c Multitenant Pluggable Database", Dated Feb. 24, 2012, 27 pages.
Agrawal et al., "Database Scalability, Elasticity, and Autonomy in the Cloud", dated 2011, 14 pages.
Anonymous, :An Oracle White Paper Oracle Database Appliance: Migration Strategies, dated Jun. 2012, 14 pages.

Anonymous: "Oracle-Base—Multitenant: Overview of Container Databases (CDB) and Pluggable Databases (PDB)", dated Mar. 3, 2014, 4 pages.
Beschastnikh et al., "Machine Learning for Automatic Physical DBMS Tuning", dated Dec. 6, 2007, 6 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Das et al., "Automated Demand-Driven Resource Scaling in Relational Database-as-aService", SIGMOD'16, Jun. 26-Jul. 1, 2016, San Francisco, CA, USA, 12 pages.
Das et al., "Scalable and Elastic Transactional Data Stores for Cloud Computing Platforms", dated Dec. 2011, 302 pages.
Dominic Betts et al., "Developing Multi-Tenant Applications For The Cloud," 3rd Edition, Microsoft, 2012, 246 pages.
Francisco Munoz et al., "Oracle Database 12c Backup and Recovery Survival Guide", dated Sep. 24, 2013, 8 pages.
Garcia-Molina et al., "Database System Implementation", dated Jan. 1, 2000, 84 pages.
Kuremoto et al., "Time Series Forecasting Using Restricted Boltzmann Machine", Emerging Intelligent Computing Technology and Applications: 8th International Conference, dated Jul. 2012, 11 pages.
Michael et al., "Downtime-Free Live Migration in a Multitenant Database", Computer Science vol. 8904, dated Feb. 5, 2015, 25 pages.
Zisman et al., "An approach to interoperation between autonomous database systems", Distrib. Syst. Engng 6 (1999) 135-148. Printed in the UK, 15 pages.
Oracle Base, Multitenant: Create and Configure a Pluggable Database (PDB) In Oracle Database 12c Release 1 (12.1), dated Jan. 8, 2014, 16 pages.
Oracle Datebase 12c, White Paper "Database Live Migration with Oracle Multitenant and the Oracle Universal Connection Pool on Oracle Real Application Clusters (RAC)", dated Oct. 15, 2014, 13 pages.
Oracle White Paper Database Live Migration with Oracle Multitenant and the Oracle Universal Connection Pool on Oracle Real Application Clusters (RAC), dated Oct. 15, 2014, 13 pages.
Oracle, "Database Concepts", 15 Backup and Recovery, dated 2016, 24 pages.
Pavlo, "Self-Driving Databases Management Systems", 8th Biennial Conference on Innovative Data Systems Research (CIDR '17), Jan. 8-11, 2017 , Chaminade California, USA, 6 pages.
Preimesberger, Chris, "Oracle Profits Up, but Revenues Slip" Oracle, dated Sep. 20, 2012, 2 pages.
Rajeev Kumar et al., Oracle DBA, A Helping Hand, Container Database and Pluggable Database (CDB & PDB), retrieved from the internet on Dec. 4, 2013, 2 pages.
Rodd et al., "Adaptive Tuning Algorithm for Performance tuning of Database Management System", (IJCSIS) International Journal of Computer Science Information Security,vol. 8, No. 1, Apr. 2010, 4pgs.
Sata's DBA Blog: "Oracle Statistics", dated Jan. 3, 2013, http://satya-dba.blogspot.com/2010/06/oracle-database-statistics-rbo-cbo.html, 14 pages.
Urbano Randy et al., "Oracle Database Administrator's Guide", 12c Release dated Jul. 31, 2017, pp. 1-1500.
Weishar et al., "An Intelligent Heterogeneous Autonomous Database Architecture for Semantic Heterogeneity Support", IEEE Workshop on Interoperability in Multidatabase Systems, dated Apr. 1991, 9 pgs.
Maenhaut et al., "Design and Evaluation of a Hierarchical Multi-Tenant Data Management Framework for Cloud Applications", dated 2015, 6 pages.
Muthukrishnan, U.S. Appl. No. 15/012,621, filed Feb. 1, 2016, Office Action, dated Jan. 25, 2021.
Hung, U.S. Appl. No. 16/135,796, filed Sep. 19, 2018, Office Action, dated Feb. 22, 2021.
Hung, U.S. Appl. No. 16/135,769, filed Sep. 19, 2018, Notice of Allowance and Fees Due, dated Mar. 23, 2022.
Hung, U.S. Appl. No. 16/135,769, filed Sep. 19, 2018, Notice of Allowance and Fees Due, dated Mar. 2, 2022.

(56) References Cited

OTHER PUBLICATIONS

Hung, U.S. Appl. No. 16/135,769, filed Sep. 19, 2018, Notice of Allowance and Fees Due, dated Jun. 8, 2022.

* cited by examiner

402 — DETECT AN INSTRUCTION TO REFRESH A CLONED DATABASE BASED ON A SOURCE DATABASE

404 — IDENTIFY A SET OF DATA BLOCKS, IN THE SOURCE DATABASE, THAT HAVE CHANGED SINCE A TIME MARKED BY A REFRESH REFERENCE TIME STAMP

406 — DETERMINE A STARTING TIME STAMP THAT MARKS A TIME OCCURRING BEFORE COPYING ANY BLOCKS, FROM THE SET OF DATA BLOCKS, INTO DATA FOR THE CLONED DATABASE

408 — COPY THE SET OF DATA BLOCKS, FROM THE SOURCE DATABASE, INTO DATA FOR THE CLONED DATABASE

410 — DETERMINE A FINAL TIME STAMP THAT MARKS A TIME OCCURRING AFTER COPYING THE SET OF DATA BLOCKS IS COMPLETE

412 — COLLECT, FROM INFORMATION FOR THE SOURCE DATABASE, REDO INFORMATION THAT WAS RECORDED BETWEEN TIMES MARKED BY THE STARTING TIME STAMP AND THE FINAL TIME STAMP

414 — BASED, AT LEAST IN PART, ON THE REDO INFORMATION, PERFORM RECOVERY ON THE CLONED DATABASE

NEAR-ZERO DOWNTIME RELOCATION OF A PLUGGABLE DATABASE ACROSS CONTAINER DATABASES

CROSS-REFERENCE TO RELATED APPLICATIONS; BENEFIT CLAIM

This application claims the benefit, under 35 U.S.C. § 120, as a Divisional of application Ser. No. 15/215,446, filed Jul. 20, 2016, which claims the benefit, under 35 U.S.C. § 119(e), of Provisional Appln. 62/245,937, filed Oct. 23, 2015 the entire contents of each of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

This application is related to the following applications, each of which is incorporated by reference as if fully set forth herein:

Application Ser. No. 13/631,815, filed Sep. 28, 2012, titled "Container Database";

Application Ser. No. 14/202,091, filed Mar. 10, 2014, titled "Instantaneous Unplug Of Pluggable Database From One Container Database And Plug Into Another Container Database";

Application Ser. No. 15/093,506, filed Apr. 7, 2016, titled "Migrating A Pluggable Database Between Database Server Instances With Minimal Impact To Performance";

Application Ser. No. 15/215,435, filed Jul. 10, 1016, titled "Cloning A Pluggable Database In Read-Write Mode"; and Application Ser. No. 15/215,443, filed Jul. 20, 2016, titled "Techniques For Keeping A Copy Of A Pluggable Database Up To Date With A Source Pluggable Database In Read-Write Mode".

FIELD OF THE INVENTION

The present invention relates to minimizing downtime of pluggable database data in connection with moving the pluggable database between container databases, and, more specifically, to moving a pluggable database between container databases while allowing read and write access to data in the pluggable database throughout the majority of the moving operation, and, also, to transparently forwarding connection requests, which request new connections to the pluggable database, from the source container database to the destination container database.

BACKGROUND

Database consolidation involves distributing and sharing computing resources among multiple databases. Databases may be consolidated using a container database management system. A consolidated database, such as a multitenant container database (CDB), includes one or more pluggable databases (PDBs). In a container database management system, each pluggable database may be open or closed in the container database independently from other pluggable databases.

Pluggable databases may be "plugged in" to a container database, and may be transported between database servers and/or DBMSs. The container database may manage multiple pluggable databases and a given database server instance may serve those pluggable databases from the container database. As such, a given container database allows multiple pluggable databases to run on the same database server and/or database server instance, allowing the computing resources of a single database server or instance to be shared between multiple pluggable databases.

An application may access a pluggable database by establishing a database session on the container database management system for that pluggable database, where a database session represents the connection between an application and the container database management system for accessing the pluggable database. A database session is initiated for a pluggable database by, for example, transmitting a request for a new connection to the container database management system, the request specifying the pluggable database. A container database management system may host multiple database sessions, each database session being for one of multiple pluggable databases.

One of the big advantages of container database architecture is the ability to provision new databases quickly. However, in order to clone a particular source PDB, the source PDB generally needs to be in read-only mode. In read-only mode, write operations are prohibited and, as such, the work that can be performed on the source PDB in read-only mode is severely limited. Thus, the requirement for a source PDB to be in read-only mode throughout the potentially significant duration of a cloning operation can generate similarly significant downtime for the source PDB. For example, copying files for a terabyte-sized PDB over a network can take days, during which no write operations may be performed on the source PDB that is required to be in read-only mode for the cloning operation.

One way to clone a PDB is by using third party tools. More specifically, the general method to use third party tools to clone a PDB is to make a hot backup of: the PDB's data files, the data files of the root database of the CDB that contains the PDB, and the redo logs. Based on this backup, a new temporary CDB is set up with just the PDB and root database of the CDB. Users may apply the redo from the redo logs until a given timestamp. A user may move the now-cloned PDB from that temporary CDB and plug the PDB into the desired destination.

However, there is a lot of overhead when a PDB clone is created using third-party tools as described above. For example, making a PDB clone using third party tools requires creating a copy of a CDB's root database data files, which is not needed for proper functioning of the resulting PDB clone. As another example, such a process may involve copying the CDB root database data file multiple times when multiple clones are required. Further, since third-party tools are not native to the database, such tools do not have access to many optimizations that are available natively in many databases. Also, it takes effort for database administrators to configure third-party tools to enable them to work with (and clone) data from a given CDB. As such, working with third-party tools to perform cloning operations on PDBs significantly increases the database provisioning costs and slows down application development that requires PDB cloning.

Moving a PDB between container databases presents many of the same problems as cloning a PDB. For example, moving the data for a PDB from a source CDB to a destination CDB can take a significant amount of time (i.e., on the order of days for very large PDBs) and it is costly to make a PDB unavailable for the duration of moving the PDB. Also, relocating a PDB to a destination CDB can be disruptive to users that use data from the PDB at the source CDB.

Generally, moving the files for a PDB between container databases may be accomplished in multiple ways, including: copying the files to an external hard drive and physically moving the hard drive to the location of the destination storage; setting up an auxiliary database that leverages replication to synchronize changes across container databases; and live migration of virtual machines from one physical server to another. However, these solutions can be difficult to implement, and it can be difficult to leverage optimizations that are built into database functionality using these solutions.

It would be beneficial to provide a way to clone or move a PDB, where the cloning/moving mechanism is native to the database, and where that mechanism eliminates the need for the PDB to be in read-only mode or offline during the operation. Furthermore, it would be beneficial to facilitate a smooth and automatic migration of application load, to the new location of a moved PDB, for applications that require access to the PDB.

Furthermore, once a PDB is cloned, it is generally difficult to refresh the PDB clone to include, in the PDB clone, changes that have occurred in the source PDB since the clone was created. Generally, in order to refresh a cloned PDB so that the cloned PDB includes the latest changes made to the source PDB, the cloned PDB must be discarded and a new clone must be produced from the source PDB. Such a requirement is extremely time consuming, especially for very large source PDBs. As such, it would be beneficial to allow a user to incrementally refresh a cloned PDB, to incorporate the latest changes made to the source PDB, without requiring creation of an entirely new clone.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 depicts a flowchart for incrementally refreshing a cloned pluggable database.

DETAILED DESCRIPTION

Figure 1:
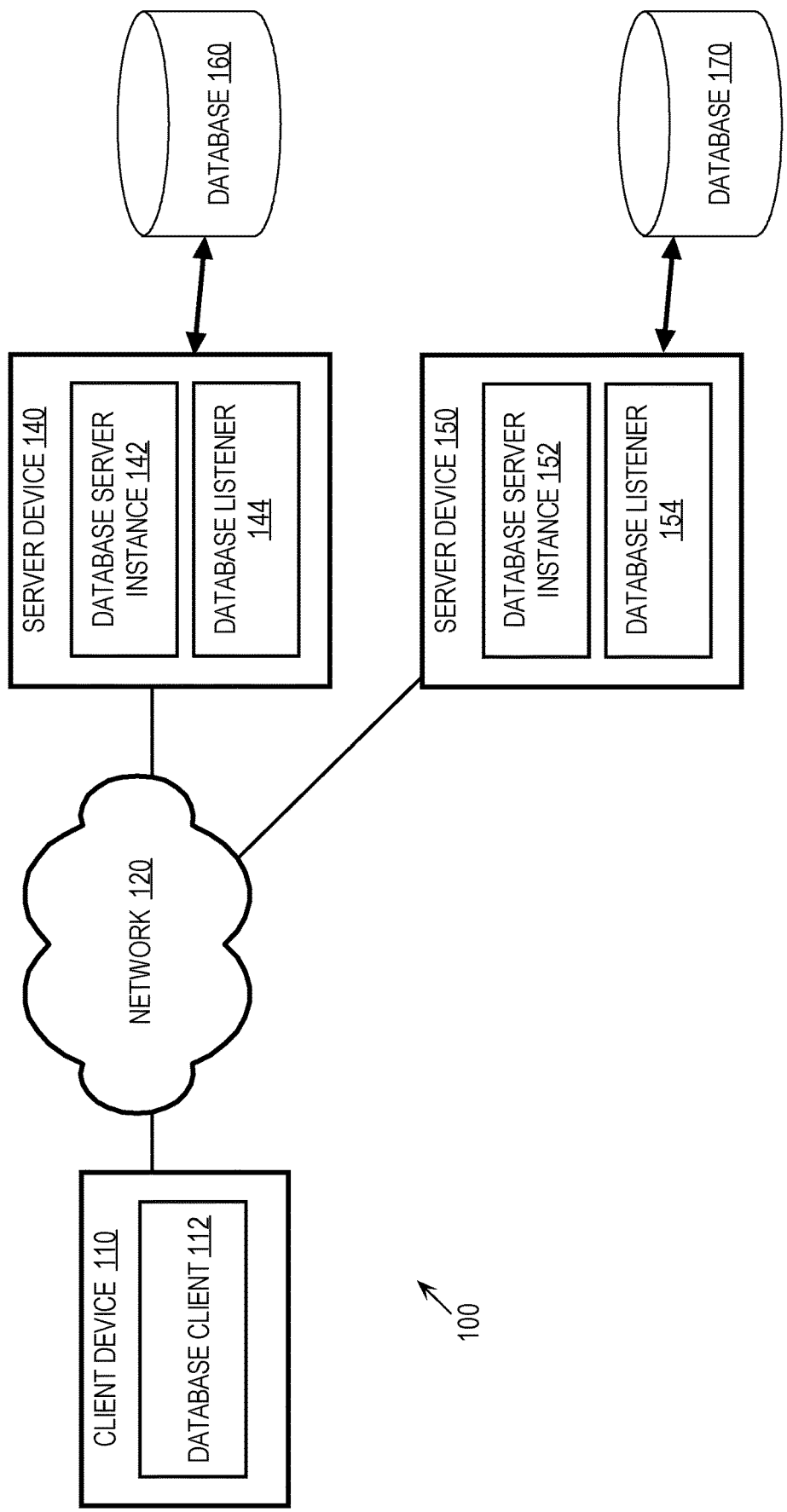
FIG. 1 is a block diagram that depicts an example network arrangement for cloning, refreshing, and moving a pluggable database.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments described herein create a clone of a PDB without the need to maintain the source PDB in read-only mode. In other words, applications may continue to write to a source PDB while a clone of the source PDB is being created, thereby minimizing the impact of the cloning operation on users accessing the source PDB.

According to one or more embodiments, a database server instance ("instance") implementing a database management system (DBMS) determines that a clone of a PDB is to be created and records an initial time stamp that marks the time at which the instance initiates creation of the clone. The PDB being cloned may be in read-write mode during any portion (or all) of creating the clone. The instance copies the source data files of the PDB and sends the files to a destination location. The instance also records another time stamp to mark the time at which the file copy was completed.

Since write operations on the source PDB continue being processed while the source PDB files are being copied, the files in the PDB clone are not consistent, or in other words, the files are not all valid as of the same time. Because the files of the PDB clone are not consistent, some of the files in the PDB clone reflect changes made to the source PDB while the file copy operation was being performed and others files in the PDB clone do not. To make the files in the PDB clone consistent, the instance performs data recovery on the PDB clone based on redo entries that record changes made to the source PDB during the time it took for the instance to copy the PDB files. This data recovery makes all changes, to the PDB clone, that occurred to the source PDB during the copy operation. Once the data recovery is completed, the files of the PDB clone are consistent and the PDB clone ready to be made live.

According to one or more embodiments, the redo information, on which the data recovery is based, is foreign to the PDB clone since the redo entries were recorded for a different PDB (i.e., for the source PDB). Since the redo entries are foreign, they refer to file identifiers (and potentially other information) for the source PDB that do not identify the corresponding data for the PDB clone. In order to apply foreign redo information to perform recovery on the PDB clone, a database server instance managing the PDB clone maintains mapping information that maps PDB source information (such as file identifiers and an identifier of the source PDB) to corresponding information for the PDB clone. The database server instance may obtain and record this mapping information as the files are being copied to the PDB clone.

Once a PDB clone is created, it can be beneficial to incrementally refresh the PDB clone to include changes made to the source PDB since a time stamp, referred to herein as the "refresh reference time stamp". A refresh reference time stamp for a PDB clone marks the time at which the PDB clone was most recently current with its source PDB. The refresh reference time stamp is initially populated to mark the time at which the PDB clone was created. Once the PDB clone has been refreshed at least once, the refresh reference time stamp marks the time at which the PDB clone was last refreshed. For example, a PDB clone that is a clone of a particular source PDB and that serves as a testing environment should be refreshed periodically so that the tests being run on the PDB clone test the changes being made to the particular source PDB.

According to one or more embodiments, a PDB clone can be incrementally refreshed by copying those data blocks (from the source PDB to the PDB clone) that have changed since the refresh reference time stamp. The source PDB may be in read-write mode during any part of the time during which the data blocks are being copied to the PDB clone. Since the source PDB may change while the data blocks are being copied to the PDB clone, recovery is performed on the PDB clone once the blocks are copied in order to make the PDB clone files consistent. This recovery is based on redo entries recorded for the source PDB during the time it took to copy the source data blocks to the PDB clone. Since all of the files in the PDB clone are now current as of a time marked by the latest time stamp on the redo entries, this time stamp becomes the new refresh reference time stamp for the PDB clone.

According to further embodiments, in the context of moving a given source PDB between container databases, creation of a PDB clone while the source PDB of the clone is in read-write mode (also called a "hot clone operation") can be leveraged to minimize impact on users that require access to the source PDB. More specifically, embodiments start moving a PDB from a source CDB to a distinct destination CDB by performing a hot clone operation to copy the files of the PDB from the source CDB to the destination CDB.

Once the PDB clone is made at the destination CDB (including a first round of recovery based on redo information from the source PDB to make the files consistent), the source PDB is closed to write operations so that changes to the source PDB cease. Then a second round of recovery is performed on the PDB clone, which recovery is based on redo entries that were recorded for the source PDB after the last redo entry that was applied to the PDB clone in connection with the first round of recovery.

This second round of recovery applies all changes that have been performed on the source PDB to the PDB clone. At that point, the PDB clone at the destination CDB is a functionally-equivalent copy of the source PDB and the PDB clone is opened for read-write operations. The source PDB may be removed from the source CDB once the copy of the PDB at the destination CDB is a functionally-equivalent copy. Since the source PDB is only closed to write operations during the time it takes to prepare and perform the second round of recovery on the PDB clone, impact of moving the PDB is minimized.

According to one or more embodiments, once the PDB has been moved from the source CDB to the destination CDB, connection requests that request new connections to access the PDB at the source CDB are transparently forwarded to the PDB clone at the destination CDB. As such, impact of moving a PDB between distinct container databases, on users that require access to the PDB, is minimized.

Architecture for Cloning, Refreshing, and Moving a Pluggable Database

FIG. 1 is a block diagram that depicts an example network arrangement for cloning, refreshing, and moving a pluggable database, according to one or more embodiments. Network arrangement 100 includes a client device 110 and server devices 140 and 150 communicatively coupled via a network 120. Example network arrangement 100 may include other devices, including client devices, server devices, storage devices, and display devices, according to one or more embodiments.

Client device 110 may be implemented by any type of computing device that is communicatively connected to network 120. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a database client 112. Database client 112 may be implemented in any number of ways, including as a stand-alone application running on client device 110, or as a plugin to a browser running at client device 110, etc. Database client 112 may be implemented by one or more logical modules. Client device 110 may be configured with other mechanisms, processes and functionalities, depending upon a particular implementation.

Network 120 may be implemented with any type of medium and/or mechanism that facilitates the exchange of information between client device 110 and any of server devices 140 and 150. Furthermore, network 120 may facilitate use of any type of communications protocol, and may be secured or unsecured, depending upon the requirements of a particular embodiment.

According to one or more embodiments, one or both of server devices 140 and 150 implement a single-server database management system (DBMS). According to one or more embodiments, one or both of server devices 140 and 150 are nodes in respective clusters of nodes managed by multi-node DBMSs, e.g., shared-everything cluster database environments (such as Oracle Real Application Clusters ("RAC")). (See "Oracle Real Application Clusters (RAC)", An Oracle White Paper, June 2013, Oracle Database 12C documentation. The afore-referenced document is incorporated by reference as if fully set forth herein.)

According to one or more embodiments, any number of nodes may be part of a node cluster managed by a multi-node DBMS. Specifically, resources from multiple nodes in a multi-node database system can be allocated to run a particular database server's software.

Server devices 140 and 150 are implemented by any type of computing device that is capable of communicating with client device 110 over network 120 and capable of running a database server instance. In network arrangement 100, server devices 140 and 150 are configured with database server instances 142 and 152, respectively.

A database server instance (or "instance") is a server that comprises a combination of the software and allocation of resources from a node. Specifically, a server, such as a database server, is a combination of integrated software components and an allocation of computational resources, such as memory, a node (i.e., a computing device), and/or processes on the node for executing the integrated software components on a processor, the combination of the software and computational resources being dedicated to performing a particular function on behalf of one or more clients (such as database client 112 on client device 110).

Database server instance 142 on server device 140 maintains access to and manages data in database 160. Database server instance 152 on server device 150 maintains access to and manages data in database 170. According to an embodiment, access to a given database comprises access to a set of disk drives storing data for the database and to data blocks stored thereon. Databases 160 and 170 may variously reside in any type of storage, including volatile and non-volatile storage, e.g., random access memory (RAM), one or more hard disks, main memory, etc.

One or more of the functions attributed to processes running on server device 140 and/or 150 as described herein may be performed by services on other server devices that are communicatively coupled to network 120. Furthermore, any of the functionality attributed to database server instances 142 and 152 herein may be performed by another logical entity of network arrangement 100, according to one or more embodiments. Also, database server instances 142 and 152 may each be implemented by one or more logical modules, and are described in further detail below.

Server devices 140 and 150 are also configured with database listeners 144 and 154, respectively. Database listener 144 and database listener 154 each represent one or more database listeners running on the respective server devices. A database listener is part of a container database management system and is configured to listen, at a given port, for requests made to the container database management system. Server devices 140 and 150 may be configured with other mechanisms, processes and functionalities, depending upon a particular implementation.

In an embodiment, each of the processes and/or functionality described in connection with database client 112, database server instances 142 and 152, database listeners 144 and 154, and/or databases 160 and 170 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Systems

Embodiments of the present invention are used in the context of database management systems (DBMSs). Therefore, a description of a DBMS is useful. A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users may interact with an instance of a database server of a DBMS by submitting, to the database server instance, commands that cause the database server instance to perform operations on data stored in a database. For example, a user at client device 110 submits, via database client 112, a database server command to database server instance 142 with which database client 112 maintains a connection. A user may be one or more applications running on client device 110 that cause database client 112 to interact with database server instance 142. Multiple parties may access database resources through a given application. Multiple parties and/or users may also be referred to herein, collectively, as a user.

A database command may be in the form of a database statement that conforms to a database language. An illustrative example database language for expressing database commands is Structured Query Language (SQL). For example, data manipulation language (DML) instructions are issued to a DBMS to manage data stored within a database structure, and SELECT, INSERT, UPDATE, and DELETE are common examples of DML instructions found in SQL implementations.

Container Database and Pluggable Database Architecture

FIGS. 2A-2D depict example resource arrangements detailing database server instances 142 and 152 and also databases 160 and 170. Specifically, in FIG. 2A, database 160 includes a root database 212 that represents the data for a container database (CDB) 210. CDB 210 contains pluggable databases (PDBs) 214 and 216. In a manner similar to database 160, database 170 includes a root database 232 that represents the data for a CDB 230. CDB 230 contains a PDB 234. According to one or more embodiments, CDBs 210 and 230 may contain any number of pluggable databases, notwithstanding the number of pluggable databases depicted in any of FIGS. 2A-2D.

A container database, such as CDB 210, that contains multiple pluggable databases provides in-database virtualization for consolidating the multiple separate pluggable databases. Pluggable databases may be "plugged in" to a container database, and the container database may be transported between database servers and/or DBMSs.

Figure 2A:
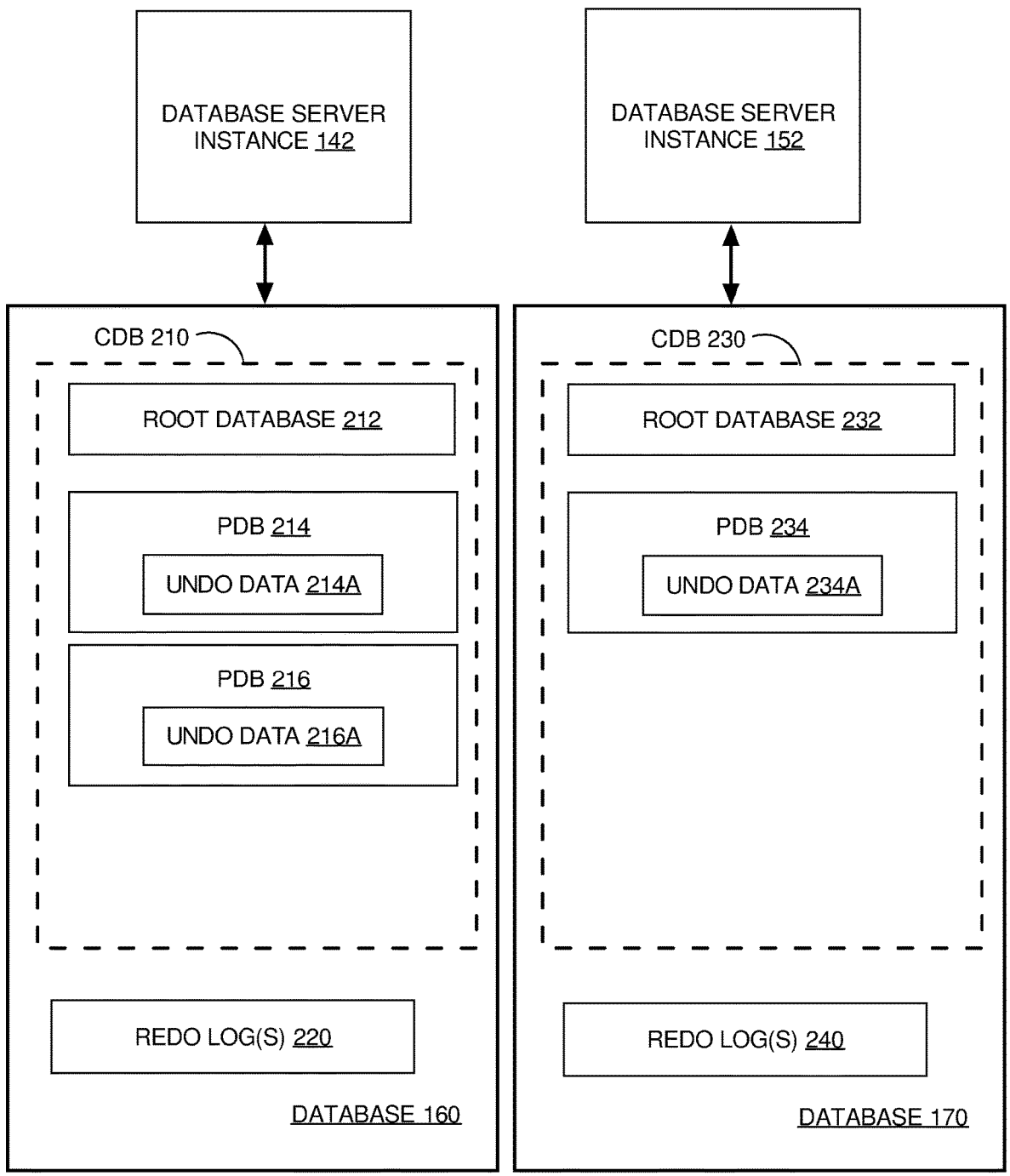
FIGS. 2A-2D depict example resource arrangements detailing database server instances and databases.

Taking database 160 as an example, root database 212 is a database used to globally manage the associated CDB 210, and to store data required to manage access to PDBs contained in CDB 210. Although root databases 212 and 232 are depicted in FIG. 2A as distinct database objects separate from other database objects, any architectural implementation for storing container database data may be used within embodiments.

Database 160 also includes redo log(s) 220 and database 170 includes redo log(s) 240. Redo logs in a given database include redo information that represents changes that have been made to data in the corresponding database. Each redo entry in the redo information that records a change made to a pluggable database includes information identifying the pluggable database in which the change was made, whether the change was committed, and a time at which the change was committed (if applicable). A redo entry may include any kind of information, depending upon particular implementations.

Pluggable Database Consistency

In order for the clone of a pluggable database to function properly, it must be transactionally consistent. A cloned PDB is transactionally consistent when the PDB can be used by a database management system to expose, to a given transaction, no uncommitted changes performed by other transactions and all committed changes performed by other transactions. A database management system collects information needed to provide a transactionally-consistent view of a PDB in undo data. As such, copying the undo data (collected for a source PDB) to the data for a cloned PDB (which was created from the source PDB) allows the PDB clone to be used in a transactionally-consistent manner based on the undo data.

Another condition for a pluggable database clone to function properly is "file consistency". For a PDB clone to have file consistency, all files in the cloned PDB must be from the same SCN (or point in time). In other words, a PDB has file consistency when all changes made to the files in the source PDB, until a given point in time, are present in the files belonging to a PDB. Herein, when all files in a cloned PDB are in the same state that the source files had at a particular point in time, the files of the cloned PDB are said to be "consistent".

One way to ensure file consistency is to freeze the source PDB being cloned in read-only mode while the clone is being created. Since write operations are not processed on a PDB in read-only mode, the files of the PDB do not change while the PDB is in read-only mode. A clone created while a source PDB is in read-only mode is an exact copy of the source PDB (which inherently has file consistency) and thus the files of the clone are also consistent.

However, depending on the size of the PDB being cloned, a cloning operation can take a significant amount of time (on the order of days for very large PDBs) in order to copy all of the source PDB files to the clone. Keeping a source PDB in read-only mode for the duration of a cloning operation greatly reduces the utility of the source PDB while it is being cloned since a significant percentage of the operations performed on a given PDB require write access to the PDB. Thus, the requirement that a PDB be in read-only mode during cloning makes cloning a costly operation.

Cloning a Pluggable Database while in Read-Write Mode

According to one or more embodiments, a PDB may be cloned while the PDB is in read-write mode where the resulting PDB clone has both transactional consistency and file consistency. Furthermore, cloning a source PDB in the background while users continue to have read and write access to the source PDB significantly decreases/virtually eliminates the cost of cloning the PDB in that access to the source PDB is not restricted during the cloning operation.

Figure 3:
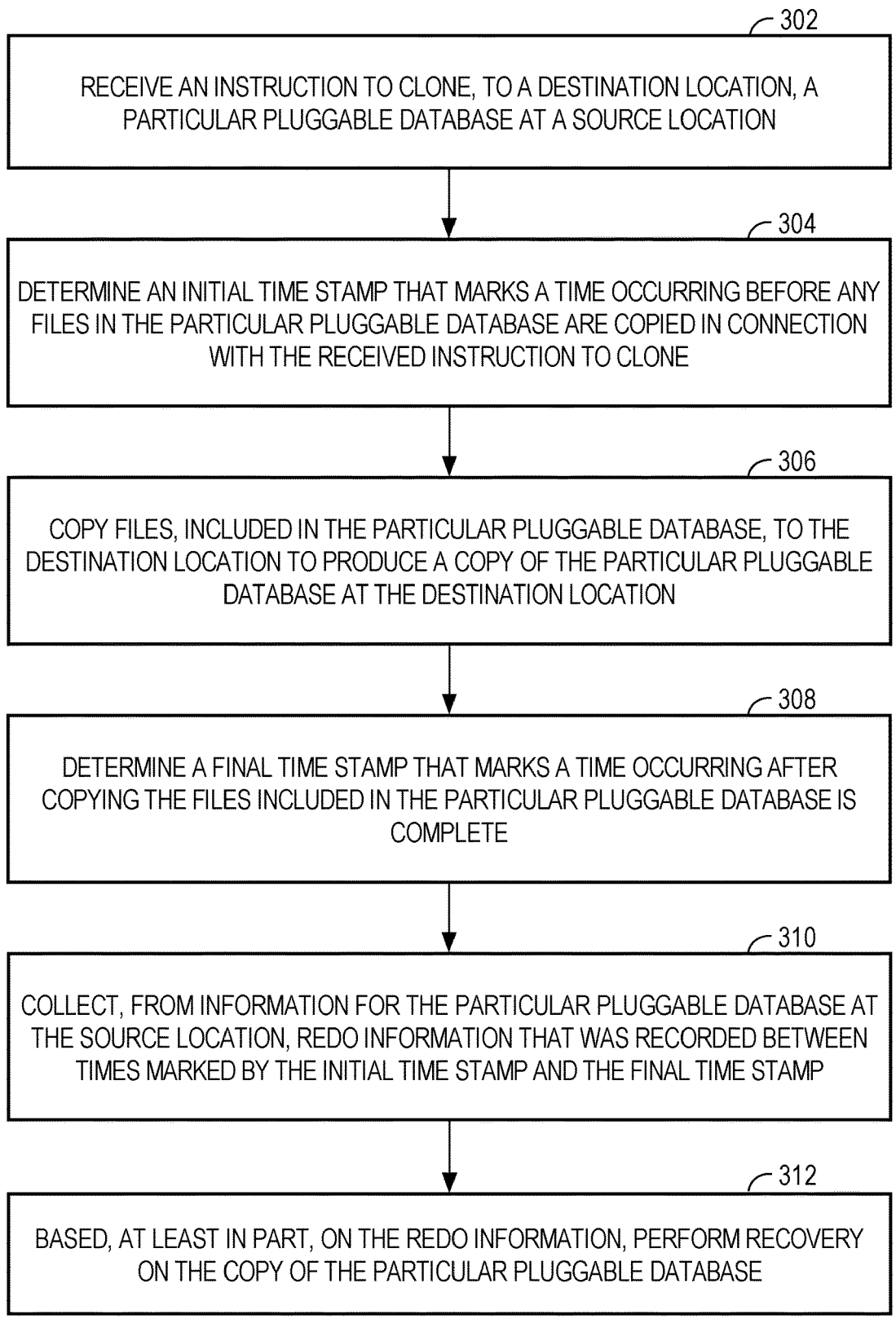
FIG. 3 depicts a flowchart for cloning a PDB while the PDB is in read-write mode.

FIG. 3 depicts a flowchart 300 for cloning a source PDB while the source PDB is in read-write mode. At step 302, an instruction to clone, to a destination location, a particular pluggable database at a source location is received. For example, database server instance 142 receives, from database client 112, an instruction to clone PDB 214 and save the clone to CDB 210, which is the CDB in which PDB 214 resides. According to one or more embodiments, receipt of the cloning instruction, by a database server instance, triggers performance of steps 304-312 of flowchart 300 such that steps 304-312 are performed in response to receiving the cloning instruction.

At step 304, an initial time stamp is determined, where the initial time stamp marks a time occurring before any files in the particular pluggable database are copied in connection with the received instruction to clone. For example, in response to receiving the cloning instruction, database server instance 142 determines and records an initial time stamp that marks a time occurring before any files of PDB 214 are copied in connection with carrying out the cloning instruction.

According to one or more embodiments, database server instance 142 obtains a checkpoint, at the initial time stamp, for files in source PDB 214. Setting this checkpoint causes all changes made to source PDB 214, until that initial timestamp, to be flushed to disk.

To illustrate, database server instance 142 records an initial time stamp that is a system change number (SCN) that marks the time at which file copying (as described in connection with step 306) commences (e.g., SCN=1010). An SCN is a logical, internal time stamp used by databases such as databases 160 and 170. Nevertheless, an SCN is a non-limiting example of a kind of time stamp, and any kind of time stamp may be used within embodiments of the invention.

At step 306, files, included in the particular pluggable database, are copied to the destination location to produce a copy of the particular pluggable database at the destination location. According to one embodiment, files in the particular pluggable database are copied to the destination location.

Figure 2B:
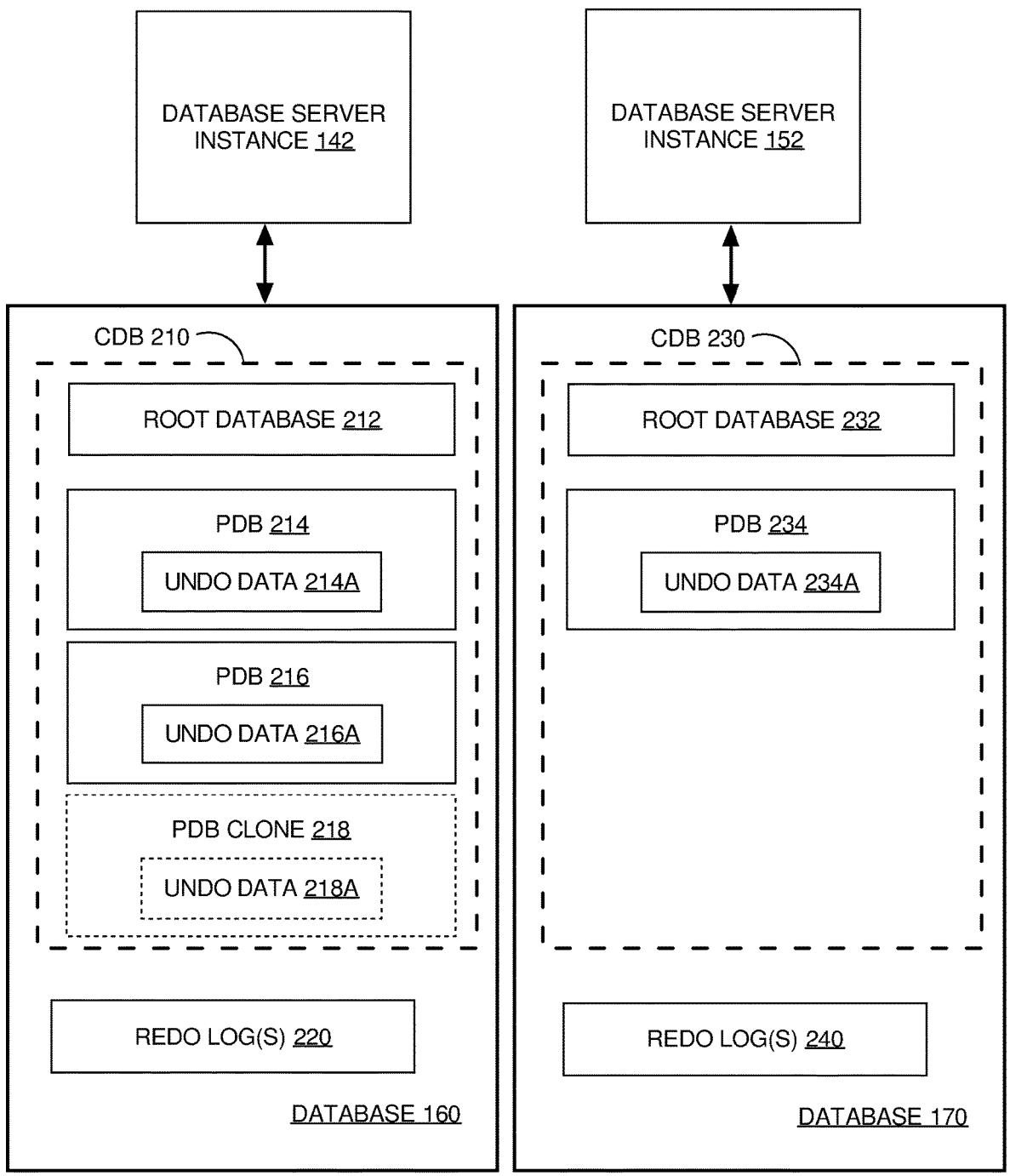

For example, database server instance 142 copies the files for PDB 214 to a copy of PDB 214 (i.e., PDB clone 218) at another distinct location within CDB 210, as depicted in FIG. 2B. Specifically, FIG. 2B depicts the network configuration of FIG. 2A in which files for PDB 214 have been copied to PDB clone 218 in CDB 210. The label "PDB clone" is utilized herein for clarity in illustration of embodiments. Once a PDB clone is made available to users, the PDB clone functions in the same way as any other PDB.

Once all of the files are copied, PDB clone 218 includes all of the files of PDB 214 (including a copy of undo data 214A at undo data 218A). However, according to one or more embodiments, PDB 214 is available for write operations (or is operated in read-write mode) during any portion or all of the copying operation. Since PDB 214 was potentially changed while PDB clone 218 was being created, the files of PDB clone 218 may not yet have file consistency.

At step 308, a final time stamp is determined, where the final time stamp marks a time occurring after copying the files included in the particular pluggable database is complete. For example, database server instance 142 determines and records a final SCN that marks a time occurring after instance 142 copies all of the files for source PDB 214 to PDB clone 218. This final time stamp may mark any time after all of the files of source PDB 214 have been copied to the requested PDB clone 218, including the time at which copying is completed. For purposes of illustration, as a non-limiting example, the final SCN recorded by instance 142 is SCN=1040.

At step 310, redo information that was recorded between times marked by the initial time stamp and the final time stamp is collected from information for the particular pluggable database at the source location. For example, database server instance 142 retrieves, from redo log(s) 220, those redo entries that are associated with SCNs between (and according to one or more embodiments including) SCNs 1010 and 1040, which are the recorded initial and final time stamps for the cloning operation of PDB 214.

Redo log(s) 220 may store redo entries for multiple pluggable databases together, or, according to implementations, may store redo entries for each pluggable database separately from redo entries for other pluggable databases. According an embodiment, the retrieved redo entries include all redo entries in redo log(s) 220 that record changes from the given time frame for any pluggable database that was changed during that time. According another embodiment, the retrieved redo entries exclude all redo entries in redo log(s) 220 that record changes for PDBs other than PDB 214. In other words, in this embodiment, the retrieved redo entries include only those redo entries, in redo log(s) 220, that record changes for PDB 214.

According to one or more embodiments, redo log(s) 220 include both (a) one or more online logs into which redo entries for PDB 214 are actively being placed; and (b) one or more archive logs that include redo entries for PDB 214 that have been archived.

At step 312, based, at least in part, on the redo information, recovery is performed on the copy of the particular pluggable database. For example, database server instance 142 performs recovery, on all of the files for PDB clone 218 (including performing recovery on undo data 218A), based on the retrieved redo entries. Specifically, instance 142 uses the information in the retrieved redo entries to make all of the files in PDB clone 218 current (and consistent) as of the final SCN (or SCN=1040). According to one or more embodiments, this retrieved redo information, which is foreign to PDB clone 218, is made applicable to PDB clone 218 based on foreign reference identifier mapping data as described below.

Performing recovery based on the retrieved redo information adjusts the files so that they are consistent with the files of the source PDB as of the final recorded time stamp.

This is important because the files in the source PDB have been changing during the copy operation, and each file is only guaranteed to be current as of the time it is actually copied. Performing recovery on the cloned PDB ensures that all of the files in the clone are valid as of the same point in time (i.e., the time marked by the final time stamp).

To be clear, the source PDB may continue to be changed after the time marked by the final time stamp. However, these changes need not be reflected in the PDB clone in order for the clone to be both file-consistent and transactionally-consistent.

Creating a Clone in a Distinct Container Database

While the given example illustrates creating a clone of a source PDB within the CDB that contains the source PDB, embodiments also create clones of a source PDB within a CDB that is distinct from the source CDB that contains the source PDB. In these embodiments, the database server instance that manages the source CDB and the database server instance that manages the destination CDB communicate any required information in order to perform the cloning operation, e.g. via network 120.

Figure 2C:
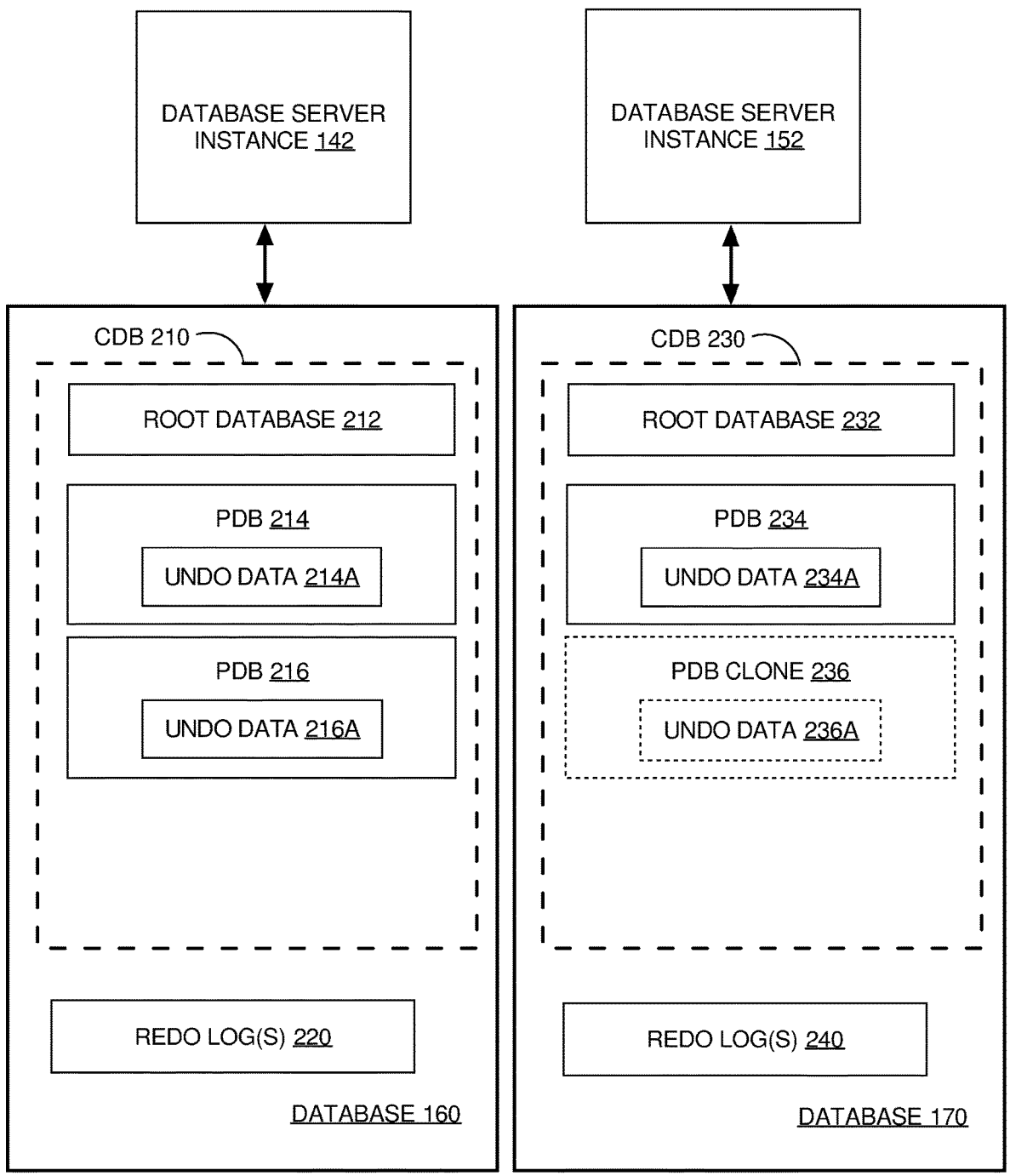

For example, database server instance 142 receives, from database client 112, an instruction to clone PDB 214 and to save the clone to CDB 230 in database 170, where CDB 230 is distinct from CDB 210. In response to receiving this request, database server instance 142 determines an initial time stamp (as described above in connection with step 304 of flowchart 300) and begins copying files from PDB 214 (in CDB 210) to a PDB clone 236 (in CDB 230) over network 120 (as described above in connection with step 306 of flowchart 300). FIG. 2C depicts PDB clone 236 (including undo data 236A) that represents the files that have been copied from PDB 214 to CDB 230.

Database server instance 142 identifies a final time stamp that marks a time after copying the files for PDB 214 is complete (as described in connection with step 308 of flowchart 300 above). For example, after all of the files for PDB 214 are copied to PDB clone 236, instance 142 identifies a final SCN that marks the time that file copy operation is completed.

Database server instance 142 collects those redo entries, from redo log(s) 220, that are associated with time stamps between (and, according to one or more embodiments, including) the initial and final time stamps recorded for the cloning operation (as described in connection with step 310 of flowchart 300 above). Instance 142 sends the collected redo entries to database server instance 152.

Database server instance 152 performs recovery on PDB clone 236 (as described in connection with step 312 of flowchart 300 above) based on the redo entries received from database server instance 142. According to one or more embodiments, this retrieved redo information, which is foreign to PDB clone 236, is made applicable to PDB clone 236 based on foreign reference identifier mapping data as described below.

Pluggable Database-Specific Undo Data

In addition to having file consistency, pluggable databases must also have transactional consistency. To this end, container databases maintain undo data for pluggable databases included therein. This undo data stores information based upon which a DBMS may roll back changes (committed or uncommitted) for data being queried by a given transaction. Rolling back changes may be performed for a variety of purposes, including for consistent read purposes, for recovery purposes after an aborted transaction, etc. For example, with reference to FIG. 2A, CDB 210 stores undo data 214A for PDB 214 and undo data 216A for PDB 216, and CDB 230 stores undo data 234A for PDB 234.

Generally, the undo data stored by a CDB is undo data that is shared for all of the contained PDBs. In such a scenario, the undo data for a given PDB is not easily separable from the undo data for other PDBs in the same CDB.

However, according to one or more embodiments, data for a given PDB includes a dedicated tablespace (including one or more data files) storing undo data for the PDB. According to one or more embodiments, the undo data stored for a particular PDB includes only undo data for that particular PDB and stores undo data for no other PDB. For example, FIG. 2A depicts undo data 214A included in the data for PDB 214. Because the undo data for PDB 214 is part of the PDB's data files, instance 142 automatically creates redo entries (i.e., stored in redo log(s) 220) for changes made to the undo data as part of recording redo entries for PDB 214.

Furthermore, because the undo data for a PDB is part of the PDB's data, copying the data for the PDB automatically includes copying the undo data for the PDB. Once the undo data for a PDB is copied to the PDB clone, the undo data is updated, with the rest of the data for the PDB, based on the redo information (e.g., as described in connection with step 312 of flowchart 300).

Foreign Reference Identifier Mapping Data

According to one or more embodiments, performing recovery on a cloned PDB based on redo information that was recorded for a distinct source PDB requires translation of references in the redo information. More specifically, the redo information recorded for a source PDB includes reference information (such as file identifiers/numbers, data block identifiers, pluggable database identifiers, etc.) that is specific to the source PDB. This source-specific reference information does not necessarily refer to the properly corresponding data in the cloned PDB since the cloned PDB includes newly copied files stored within different data blocks (whether the destination of the PDB clone is the source CDB that stores the source PDB, or the destination of the PDB clone is a different CDB than the source CDB).

To illustrate, a redo entry includes information identifying a file to which the redo entry is applicable, such as an actual file number (AFN) that identifies a file, and a data block address (DBA) that identifies a data block within the file, etc. For example, a particular redo entry includes foreign reference information as follows: a PDB identifier "124", an AFN "9", and a DBA "10". This reference information indicates that the entry includes change information for a change made to the source PDB in a data block with DBA=10 in a file, in the source PDB, with the AFN of 9.

The destination database server instance, which manages the PDB clone, creates mapping data that maps reference information that is specific to the source PDB (referred to herein as "foreign" information) to reference information that is specific to the cloned PDB (referred to herein as "local" information). A database server instance creates the foreign reference identifier mapping data at any time, e.g., while the files for the source PDB are being copied to the destination location, after the files for the source PDB are copied to the destination location, etc.

Application of foreign redo entries to perform recovery on a PDB requires verification that the redo entries are being used only when those entries are applicable. As such, during recovery of the PDB clone using redo information from the source PDB, the database server instance managing the PDB clone translates, based on the mapping data, foreign references in the redo information to local references that reference the corresponding information in the PDB clone. As previously stated, this foreign reference mapping data is required to apply foreign redo information whether or not the PDB clone is created in the same CDB as the source PDB.

Continuing with the above example, the database server instance managing the PDB clone determines, based on the mapping data, that the foreign PDB identifier "124" in the redo entry maps to the PDB identifier "236" of the PDB clone. As such, the foreign redo entry should be applied to the data in the PDB clone. According to one or more embodiments, the database server instance managing the PDB clone identifies the local PDB identifier that is mapped to the foreign PDB identifier, in the mapping data, once during performing recovery for the PDB clone. Afterwards, all redo entries that include the foreign PDB identifier that maps to the local PDB identifier of the PDB clone are used to perform recovery for the PDB clone. The database server instance does not base recovery of the PDB clone on redo entries that are associated with PDB identifiers other than the foreign PDB identifier that maps to the local PDB identifier of the PDB clone.

Continuing with the example, in order to perform recovery based on the particular redo entry, the destination database server instance looks up, in the mapping data, the local file number that corresponds to the foreign AFN of 9. Based on the mapping data, the database server instance determines that the local file number corresponding to the foreign AFN of 9 is AFN=20. According to one or more embodiments, the destination database server instance also looks up the local DBA corresponding to the foreign DBA indicated in the redo entry to be applied. Instance 152 performs recovery, based on the particular redo entry, at the location indicated by the local reference identifiers that instance 152 identified based on the mapping data.

Connecting to Access the Cloned Database

Once recovery is performed on the PDB clone, which means that all of the files in the PDB clone are current as of the same point in time, the cloned PDB is made available to users. For example, when the files of PDB clone 218 have been updated based on the retrieved redo information, as described in connection with step 312 of flowchart 300, database server instance 142 registers, with a connection manager, information indicating that PDB clone 218 is available for new connections. For example, the connection manager manages one or more connection pools for one or more applications that require access to pluggable databases in CDB 210. When the connection manager receives a request for a new connection to access PDB clone 218, and in the absence of any previously-established connections for accessing PDB clone 218 that may be utilized to fulfill the request, the connection manager initiates a new connection for accessing PDB clone 218, i.e., via database server instance 142.

One or more users may utilize the established connection to query data in PDB clone 218. According to one or more embodiments, undo data 218A is used according to the normal course of database functioning to roll back committed and/or uncommitted changes made to data in PDB clone 218 for a variety of purposes including consistent read for data requested by queries, etc. Undo data 218A includes information about transactions that were committed or aborted at the source PDB of PDB clone 218. When a query over PDB clone 218 refers to data that was changed by a transaction that was aborted at the source PDB of PDB clone 218, the managing database server instance consults the transaction table included in undo data 218A, and upon detecting that the data was changed by an uncommitted transaction, performs rollback of the changes caused by the aborted transaction.

Refreshable Pluggable Database Copy

Many times, users need to update a clone of a pluggable database in order to incorporate, in the cloned pluggable database, the latest changes made to the clone's source pluggable database. For example, a user produces a clone of a particular PDB, which represents a production and test environment. After the clone is created, the source PDB (that is the source of the cloned PDB) continues processing write operations, i.e., operating in read-write mode. After a certain amount of time, it would be beneficial for the cloned PDB to incorporate any changes made to the source PDB since the clone was created so that the clone, which is acting as a production and test environment, is up-to-date.

Generally, in order to update a cloned PDB to include all changes made to the clone's source PDB, the clone must be regenerated based on the newest version of the source PDB. However, it is costly to produce new clones of pluggable databases on a regular basis (e.g., every day, every hour, etc.) as would be desirable from the standpoint of data recency in many situations.

According to one or more embodiments, a user may incrementally refresh a cloned PDB, which causes the PDB clone to incorporate changes made to the clone's source PDB without regenerating the PDB clone in its entirety. Furthermore, the cloned PDB may be refreshed while the source PDB is in read-write mode. According to one or more embodiments, incrementally refreshing a PDB clone involves copying, to the PDB clone data, only those portions of the source PDB that have been changed so as to minimize processing time for incrementally refreshing the cloned PDB.

FIG. 4 depicts a flowchart 400 for incrementally refreshing a cloned pluggable database. At step 402, an instruction to refresh a cloned database based on a source database is detected. According to one or more embodiments, the cloned and source databases are pluggable databases. According to further embodiments, the cloned and source databases are any kind of database that is able to be cloned. Non-limiting examples are provided herein that illustrate embodiments in the context of pluggable databases.

To illustrate step 402, database server instance 152 detects an instruction to refresh a cloned database when instance 152 receives, from database client 112, an instruction to refresh PDB clone 236 in CDB 230, which is a clone of source PDB 214 in CDB 210 (as depicted in FIG. 2C).

As another example, previous to detecting an instruction to refresh a cloned database, database server instance 152 receives an instruction to automatically refresh PDB clone 236 at regular time intervals (e.g., every 24 hours, every 30 minutes, etc.). According to one embodiment, a definition of the regular time intervals is provided in connection with the instruction to automatically refresh the PDB clone, i.e., as a parameter to the instruction. According to another embodiment, the definition of the regular time interval is a default regular time interval definition that is accessible by instance 152. In this example, instance 152 detects an implied instruction to refresh PDB clone 236 when the time to refresh PDB clone 236 has arrived, as indicated by the previously-received instruction to automatically refresh the PDB clone at regular time intervals.

In order to refresh a PDB clone, the database server instance must be able to identify the source PDB of the PDB clone. According to an embodiment, the received instruction includes a reference to a source PDB based on which to perform the refresh operation for the indicated PDB clone. According to another embodiment, the PDB clone includes a reference to the source PDB based on which the PDB clone was originally copied. For example, since PDB clone 236 was originally created by copying PDB 214, PDB clone 236 includes a reference to PDB 214 identifying that pluggable database as the source of PDB clone 236.

According to one or more embodiments, a PDB clone may be created as a refreshable PDB clone. A refreshable PDB clone includes, in addition to other information that is generally required for a PDB clone, information that facilitates the incremental refresh of the clone. For example, a refreshable PDB clone includes one or more of the following information that facilitates incremental refresh: a refresh reference time stamp, mapping data that maps foreign reference information in the source PDB to local reference information in the PDB clone, information identifying the source PDB of the PDB clone, information required to contact a database server instance that manages the source PDB of the PDB clone, etc.

According to one or more embodiments, detecting the refresh instruction triggers refresh of the PDB clone. In other words, steps 404-414 of flowchart 400 are triggered by a database server instance detecting the refresh instruction such that steps 404-414 are performed in response to the database server instance detecting the refresh instruction.

Preparing a PDB Clone for Refresh

According to one or more embodiments, a refreshable PDB clone, such as PDB clone 236, is operated in read-write mode. In other words, after a cloning operation, the data in the refreshable PDB clone diverges from the data in the PDB clone's source PDB. However, in order to refresh the PDB clone, the data in the clone must not be divergent from the source PDB data. In other words, the PDB clone data must be in a state in which the source PDB data existed at one point in time. If the PDB clone does not diverge from the source PDB, it is possible to apply, to the clone, those changes that have occurred in the source PDB since that point in time, in order to bring the cloned PDB up-to-date with the source PDB.

When a refreshable PDB clone has been operating in read-write mode, the PDB clone is rolled back to a state at which the PDB clone data was not divergent from the source PDB data. To illustrate, continuing with the example described in connection with step 402 of flowchart 400, PDB clone 236 operates in read-write mode and one or more changes are made to the data of PDB clone 236 that cause PDB clone 236 to diverge from the data in source PDB 214. Detecting the refresh instruction triggers database server instance 152 to determine whether one or more changes have been made to PDB clone 236 since a time marked by a refresh reference time stamp such that determining whether one or more changes have been made to the PDB clone is performed in response to detecting the refresh instruction.

A refresh reference time stamp marks a time at which PDB clone 236 reflected the data of source PDB 214 without divergent changes. For example, the refresh reference time stamp for PDB clone 236 marks the time at which PDB clone 236 was created from source PDB 214. According to one or more embodiments, a refreshable PDB clone stores the latest applicable refresh reference time stamp in its data store.

In response to database server instance 152 determining that one or more changes have been made to PDB clone 236 since a time marked by a refresh reference time stamp, i.e., because PDB clone 236 has been operating in read-write mode since the time marked by the refresh reference time stamp and has processed one or more write operations on the data for PDB clone 236, database server instance 152 rewinds the state of the data in PDB clone 236 back to the state in which PDB clone 236 existed at the time marked by the refresh reference time stamp.

Database server instance 152 may revert the state of the data in PDB clone 236 back to the state in which it existed at a given point in time in a variety of ways. To illustrate, database server instance 152 establishes a restore point for PDB clone 236 that marks the state of the data in PDB clone 236 at the time indicated by the refresh reference time stamp. Database server instance 152 performs a flashback on the data in PDB clone 236 based on the restore point. As a further illustration, database server instance 152 performs a point-in-time recovery for the data in PDB clone 236 based on such a restore point, etc.

Copying Changed Data Blocks from the Source PDB to the Cloned PDB

Returning to the discussion of flowchart 400 (FIG. 4), at step 404, a set of data blocks, in the source database that have changed since a time marked by a refresh reference time stamp, are identified. According to one or more embodiments, a refreshable PDB clone includes information required to connect to the database server instance (or "source instance") that manages the clone's source PDB. For example, when the refreshable PDB clone is created, the user specifies a database link in the SQL statement that creates the clone, which link can be used to connect to the clone's source PDB. Using that information, the database server instance that manages the PDB clone (or "destination instance") contacts the source instance to request the set of data blocks, in the source PDB, that have changed since the time marked by a refresh reference time stamp of the PDB clone.

For example, PDB clone 236 includes information needed for database server instance 152 to communicate with database server instance 142. Using that information, database server instance 152 requests, from database server instance 142, the set of data blocks in PDB 214 that have changed since a time indicated by the refresh reference time stamp that is recorded in PDB clone 236. According to an embodiment, instance 152 includes, in the request, at least an identifier of PDB 214 and the refresh reference time stamp.

In response to receiving the request for the set of data blocks, database server instance 142 identifies the set of blocks in source PDB 214 that have changed since the time indicated in the refresh reference time stamp. According to an embodiment, instance 142 maintains change information indicating times at which data blocks in PDB 214 have been changed. Instance 142 determines, based on the change information, the set of data blocks to return as a response to the request for the set of data blocks by identifying those data blocks that are associated with change time stamps, in the change information, that mark times that occur after the time marked by the refresh reference time stamp.

According to another embodiment, instance 142 performs a comparison between source PDB 214 and PDB clone 236 to identify those data blocks that are different between source PDB 214 and PDB clone 236. In such an embodiment, PDB clone 236 need not be rewound to eliminate divergence of the clone from the clone's source data since the comparison between pluggable databases would inherently identify any data block in the PDB clone that is different from a corresponding data block in the source PDB no matter the cause of the change.

Database server instance 142 sends, to instance 152 as a response to the request for the set of data blocks, only those data blocks in PDB 214 that are identified as different than the data blocks in PDB clone 236. The data blocks may be sent all at once or may be sent in groups of one or more blocks over a period of time.

At step 406, a starting time stamp is determined, where the starting time stamp marks a time occurring before copying any blocks, from the set of data blocks, into data for the cloned database. For example, database server instance 142 records, as the starting time stamp, a time stamp that marks the time at which instance 142 receives, from instance 152, the request for the set of changed data blocks. As another example, database server instance 142 records, as the starting time stamp, a time stamp that marks the time at which database server instance 142 initiates gathering and sending data blocks to instance 152 to fill the request for the set of changed data blocks.

At step 408, the set of data blocks are copied from the source database into data for the cloned database. For example, database server instance 152 receives, from database server instance 142, changed data blocks from source PDB 214, and database server instance 152 saves those data blocks to the data for PDB clone 236. In order to save the data blocks to PDB clone 236, instance 152 identifies corresponding data blocks within PDB clone 236 that correspond to the data blocks being received and instance 152 replaces the data blocks in PDB clone 236 with the corresponding received data blocks from PDB 214.

In order to identify data blocks from source PDB 214 that correspond to the data blocks from PDB clone 236, database server instance 152 utilizes foreign reference mapping data that maps foreign reference identifiers for source PDB 214 (such as file numbers and block numbers) to corresponding local reference identifiers for PDB clone 236, which mapping data is described in further detail above. PDB clone 236 is saved as a refreshable PDB clone, and, as such, database server instance 152 creates the foreign reference mapping data when PDB clone 236 is created for use in connection with PDB clone refresh operations.

For each data block in the set of source PDB data blocks, database server instance 152 identifies a data block in PDB clone 236 that corresponds to the source PDB data block based on the foreign reference mapping data. Instance 152 then replaces each identified data block in PDB clone 236 with the corresponding source PDB data block.

At step 410, a final time stamp is determined, which final time stamp marks a time occurring after copying the set of data blocks is complete. For example, database server instance 142 identifies, as the final time stamp, a time stamp that marks the time at which instance 152 finishes replacing each identified data block in PDB clone 236 with the corresponding source PDB data block. As another example, database server instance 142 identifies, as the final time stamp, a time stamp that marks the time at which database server instance 142 finishes sending the data blocks to instance 152.

Refreshing the Cloned Database Based on Redo Information from the Source Database According to one or more embodiments, copying the set of data blocks is performed, at least partially, while the source database is in read-write mode. For example, while instance 142 gathers and sends information for the set of data blocks, in source PDB 214, that have changed since the time marked by the refresh reference time stamp (referred to herein as the "block copy operation"), source PDB 214 is open to write operations. Therefore, it is possible that one or more write operations have changed data in source PDB 214 during the time it took to complete the block copy operation.

As such, once all of the data blocks from source PDB 214 are stored to the data of PDB clone 236, PDB clone 236 has been updated, but it is possible that not all of the data blocks are current as of the same point in time (i.e., PDB clone 236 is potentially lacking file consistency). In order to ensure that the files in PDB clone 236 are current as of the same time, any changes that were made to source PDB 214 while instance 142 was performing the block copy operation must be applied to PDB clone 236. Accordingly, as described in connection with step 412 and 414, recovery is performed on PDB clone 236 based on redo information recorded for source PDB 214 such that PDB clone 236 is made file-consistent as of a particular point in time.

At step 412, redo information, that was recorded between times marked by the starting time stamp and the final time stamp, is collected from information for the source database. For example, database server instance 142 collects, from redo log(s) 220 those redo entries that are associated with time stamps that mark times between times marked by the starting time stamp and the final time stamp identified by instance 142 as described in connection with steps 406 and 410.

According an embodiment, the retrieved redo entries include all redo entries in redo log(s) 220 that record changes from the given time frame, including redo entries that are applicable to PDBs other than PDB 214. According to another embodiment, the retrieved redo entries exclude all redo entries in redo log(s) 220 that record changes for PDBs other than PDB 214. In other words, in this embodiment, the retrieved redo entries include only those redo entries, in redo log(s) 220, that record changes for PDB 214.

At step 414, based, at least in part, on the redo information, recovery is performed on the cloned database. For example, database server instance 142 sends, to database server instance 152, the redo information collected as described in connection with step 410. In turn, instance 152 performs recovery, on the files for PDB clone 236 (including undo data 236A), based on the retrieved redo entries. Specifically, instance 152 applies the changes indicated in the retrieved redo entries to PDB clone 236, which makes all of the files in PDB clone 236 current as of the final time stamp recorded by instance 142. According to one or more embodiments, this final time stamp is made the new refresh reference time stamp for PDB clone 236.

As described above, and according to one or more embodiments, performing recovery on PDB clone 236 based on redo information recorded for source PDB 214 requires reference translation based on foreign reference mapping data stored by instance 152. Using this mapping data, instance 152 translates reference information, in the retrieved redo entries, from foreign references (relative to source PDB 214) to local references (relative to PDB clone 236). The redo information is applied to PDB clone 236 using the translated local references.

Online Relocation of a Pluggable Database Between Container Databases

At times, a pluggable database needs to be relocated from one container database to another distinct container database. The relocated pluggable database must include all changes that have been successfully committed in the source pluggable database, since, after relocation, the pluggable database will no longer exist at the source location. When cloning a particular source pluggable database, the pluggable database clone never needs to fully catch up to the source pluggable database since the pluggable database clone only reflects a consistent view of the data from the source at a given point in time and, as such, the source pluggable database never need be closed to write operations (as described above). In contrast, when a pluggable database is relocated, the pluggable database must be made unavailable to operations for some amount of time in order to allow the copy of the pluggable database to reflect all changes successfully made to the source pluggable database.

It is not desirable to make a pluggable database unavailable to operations for any significant amount of time. However, depending on the size of the pluggable database, a pluggable database relocation can take a significant amount of time, sometimes days. If the source container databases and the destination container database (for a relocating pluggable database) do not share storage, then relocating a pluggable database involves physically moving the database files. The destination container database of the pluggable database may be in a different data center, and even a different geographic region than the source container database.

To illustrate, a client may want to move a locally-hosted terabyte-sized pluggable database to a cloud hosting service, which requires moving the myriad of files for the pluggable database from a local hosting facility in Austin, Tex. to a facility that hosts the cloud information in Salt Lake City, Utah. It could take days to copy the files for the pluggable database over a network to the destination CDB, and it could potentially take days to copy the files for the pluggable database to an external hard drive and physically transport the files to the destination facility for upload to the destination CDB. Because of the amount of time it can take to move the files of a source pluggable database, it can be very costly to limit the availability of the source pluggable database while the files are being moved.

In order to maximize the availability of a pluggable database while the pluggable database is being moved between container databases, a functionally-equivalent copy of the pluggable database is created (e.g., at the destination CDB). During the majority of such a copy operation, the pluggable database is available for read and write access. A functionally-equivalent copy of a source PDB is a copy of the source PDB that reflects all changes that have been performed to the source PDB. A functionally-equivalent copy of a source PDB may be an exact copy of the source PDB, or may be a copy of the source PDB that, when queried, (a) functions in essentially the same way that the source PDB would function and (b) returns the same data that the same query on the source PDB would return.

Figure 5:
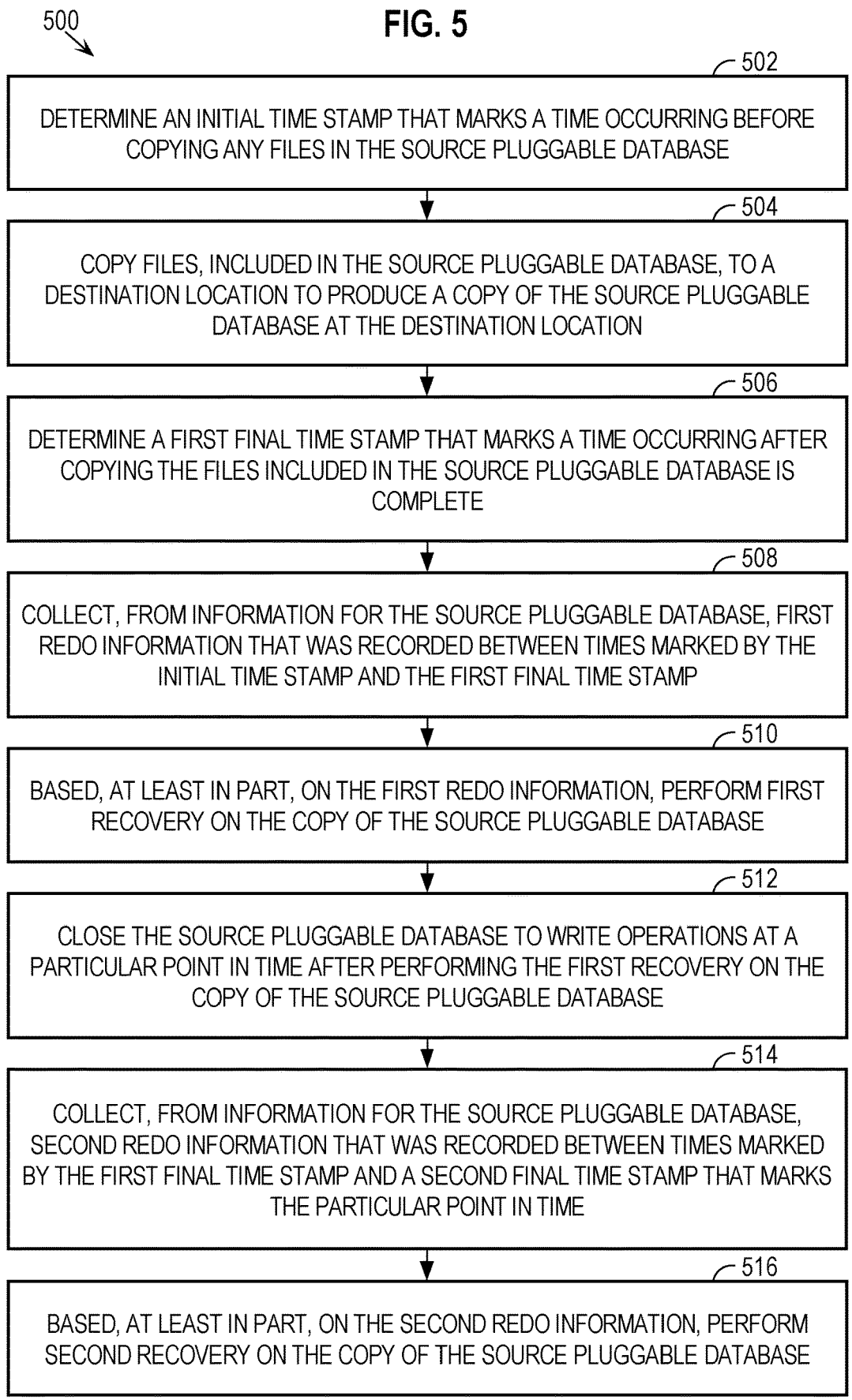
FIG. 5 depicts a flowchart for creating a functionally-equivalent copy of a particular source PDB.

As such, FIG. 5 depicts a flowchart 500 for creating a functionally-equivalent copy of a particular source PDB. According to an embodiment, the steps of flowchart 500 are triggered by receiving an instruction to create a functionally-equivalent copy of the source PDB such that the steps of flowchart 500 are performed in response to receiving an instruction to create a functionally-equivalent copy of the source PDB. The functionally-equivalent copy may be located in the same CDB as the source PDB. According to another embodiment, the steps of flowchart 500 are triggered by receiving an instruction to move the source pluggable database from a source CDB to a destination CDB, since creating a functionally-equivalent copy is a part of moving a PDB between CDBs, as described in further detail below. When the steps of flowchart 500 are triggered by receiving the instruction to move the PDB, the steps of flowchart 500 are performed in response to receiving the instruction to move the PDB.

Creating a functionally-equivalent copy of a source pluggable database, according to the steps of flowchart 500, is performed such that write operations, on the pluggable database at the source CDB, may continue to be processed during the majority of the copy operation (i.e., during steps 502-510 that occur prior to the step of closing the source PDB to write operations). In this manner, embodiments impose limited availability on the pluggable database data for a relatively small amount of time, i.e., since steps 512-516 of flowchart 500 (during which availability of the pluggable database is limited) take a small amount of time relative to the amount of time it takes to perform steps 502-510 of flowchart 500.

According to one or more embodiments, certain elements of flowchart 500 are substantially similar to certain corresponding elements of flowchart 300. According to one or more embodiments, inasmuch as a given element of flowchart 500 is similar to an element of flowchart 300, description given in connection with the element of flowchart 300 is applicable to the corresponding element of flowchart 500. Likewise, according to one or more embodiments, inasmuch as a given element of flowchart 300 is similar to an element of flowchart 500, description given in connection with the element of flowchart 500 is applicable to the corresponding element of flowchart 300.

At step 502 of flowchart 500, an initial time stamp is determined, where the initial time stamp marks a time occurring before copying any files in the source pluggable database. For example, database server instance 142 detects the need to create a functionally-equivalent copy of PDB 214 (located in CDB 210) with a destination location of CDB 230. This is a non-limiting example in that a functionally-equivalent copy may be made within the same CDB or within a CDB that is distinct from the source CDB in which the source PDB resides. In connection with creating the functionally-equivalent copy, instance 142 determines and records an initial time stamp that marks a time occurring before any files are copied in connection with creating the functionally-equivalent copy of PDB 214. For example, instance 142 identifies a time stamp that marks the time at which instance 142 detects the need to create a functionally-equivalent copy of PDB 214 as the initial time stamp.

At step 504, files included in the source pluggable database are copied to a destination location to produce a copy of the source pluggable database at the destination location. For example, database server instance 142 creates copies of the files of PDB 214 and causes the file copies to be sent to database server instance 152 (which manages the destination location, i.e., CDB 230). According to an embodiment, the copies are created and then sent to the destination location via a network. According to an alternative embodiment, in the case where the destination location shares storage with the source location of the source PDB, the copies are performed directly from the source location to the destination location.

Database server instance 152 receives the copies of the files of source PDB 214 and saves the file copies to PDB clone 236 (as depicted in FIG. 2C). According to one or more embodiments, PDB 214 is operated in read-write mode during at least a portion (if not all) of the time during which files from PDB 214 are copied.

At step 506, a first final time stamp is determined, where the first final time stamp marks a time occurring after copying the files included in the source pluggable database is complete. For example, database server instance 142 determines and records a first final time stamp that marks a time occurring after instance 142 finishes copying all of the files for PDB 214. This time stamp may mark any time after all of the files of the source PDB have been copied for the functionally-equivalent copy as described in connection with step 504.

At step 508, first redo information that was recorded between times marked by the initial time stamp and the first final time stamp are collected from information for the source pluggable database. For example, database server instance 142 retrieves, from redo log(s) 220, a first batch of redo entries that are associated with time stamps that mark times between the identified initial time stamp and first final time stamp. The retrieved redo entries at least include entries indicating changes made to PDB 214 during the indicated time period.

At step 510, first recovery is performed on the copy of the source pluggable database based, at least in part, on the first redo information. For example, database server instance 142 sends the first batch of redo information indicating changes made to source PDB 214 to database server instance 152. Instance 152 then performs a first round of recovery, on all of the files for PDB clone 236 (including undo data 236A), based on the retrieved redo entries in the first redo information. Since the redo information was recorded for PDB 214 and not for PDB clone 236, application of the redo information for PDB clone 236 involves translating reference information in the redo information based on foreign reference mapping data as described in detail above. This recovery operation makes all of the files in PDB clone 236 current as of the first final time stamp.

At this point, PDB clone 236 is consistent transactionally (because of undo data 236A that includes information about rolling back uncommitted changes) and is file-consistent as of the first final time stamp. However, according to one or more embodiments, PDB 214 may be available to receive and process write requests during any portion (or all of) steps 502-510 of flowchart 500, which means that it is possible that the data in PDB 214 has changed from the data now in PDB clone 236.

In order to make PDB clone 236 functionally equivalent with source PDB 214, PDB 214 is closed to write operations and PDB clone 236 is caught up to the current state of PDB 214. If PDB 214 were to remain open to, and continue processing, write operations, it may not be possible to catch PDB clone 236 up to the state of PDB 214 since the data of PDB 214 would have the potential to be continually changing.

As such, at step 512 of flowchart 500, the source pluggable database is closed to write operations at a particular point in time after performing the first recovery on the copy of the source pluggable database. For example, in response to completing performance of the first round of recovery on PDB clone 236, database server instance 152 sends a message to database server instance 142 indicating that instance 142 should stop processing write operations on PDB 214. In response to receiving the message, instance 142 stops further write operations from being performed on source PDB 214.

Instance 142 may stop further write operations from being performed on source PDB 214 in a variety of ways. According to an embodiment, instance 142 stops further write operations from being performed on source PDB 214 by preventing any new queries from performing write operations within source PDB 214 while allowing transactions (that include write operations) that have already initiated to finish processing. In this embodiment, the write operations on PDB 214 are considered stopped when the last transaction that includes write operations over data in PDB 214 terminates and the only remaining activity within PDB 214 is read-only activity.

According to another embodiment, instead of allowing transactions that are performing write operations to complete processing, instance 142 causes PDB 214 to be run in read-only mode and, upon switching PDB 214 from read-write mode to read-only mode, transactions processing data in PDB 214 are no longer allowed to perform write operations. As such, once PDB 214 is switched to read-only mode, transactions that are currently processing data in PDB 214 will receive errors in response to attempting performance of write operations in PDB 214. In this embodiment, the write operations on PDB 214 are considered stopped when PDB 214 is switched to read-only mode.

According to an embodiment, instance 142 records the particular point in time at which write operations are stopped in PDB 214. This information is used in determining what redo information should be gathered for the second round of recovery to be performed on the PDB clone, as described in further detail in connection with steps 514 and 516 below.

Specifically, at step 514 of flowchart 500, second redo information, that was recorded between times marked by the first final time stamp and a second final time stamp that marks the particular point in time, is collected from information for the source pluggable database. As such, the second redo information represents those changes that (a) were recorded for the source PDB up until the source PDB was closed to write operations, and (b) have not yet been applied to the PDB clone.

To illustrate step 514, database server instance 142 retrieves, from redo log(s) 220, a second batch of redo entries, where the redo entries in the second batch are associated with time stamps that mark times between (and according to one or more embodiments including) (a) the first final time stamp that marks the most recent change that was applied to PDB clone 236 in the first round of recovery and (b) the time at which instance 142 stopped write operations for source PDB 214. Thus, the second redo information includes those redo entries recorded for PDB 214 that represent all changes made to PDB 214 that are not yet reflected in PDB clone 236.

In an embodiment, instance 142 retrieves, from redo log(s) 220, only those redo entries that were recorded for source PDB 214. For example, redo log(s) 220 stores data for PDB 214 in a tablespace dedicated to redo entries for PDB 214, and instance 142 retrieves the second redo information from this tablespace. In this embodiment, there is no need to record a second final time stamp for use in querying redo log(s) 220 for the second redo information since no redo entries included in the dedicated tablespace would be associated with time stamps that mark times occurring after write operations were stopped for PDB 214. As such, the second final time stamp referred to in step 514 would be inherent in the data recorded in the dedicated tablespace in redo log(s) 220.

At step 516, based, at least in part, on the second redo information, second recovery is performed on the copy of the source pluggable database. For example, database server instance 142 sends, to database server instance 152, the second batch of redo entries described in connection with step 514. Database server instance 152 performs a second recovery operation on PDB clone 236 based on the second redo information for PDB 214. According to one or more embodiments, the foreign reference information in the second redo information is translated to local reference information based on foreign reference mapping data, as described in detail above. This second round of recovery makes PDB clone 236 a functionally-equivalent copy of source PDB 214, and, as such, PDB clone 236 reflects all changes that have been made to PDB 214 up to the current time.

Moving a PDB from a Source CDB to a Destination CDB Using a Functionally-Equivalent Copy Flowchart 500 describes a process for producing a functionally-equivalent copy of a PDB. Creating a functionally-equivalent copy is particularly useful in connection with moving a PDB between distinct container databases. Thus, according to an embodiment, an instruction is received, where the instruction is to move, to a destination container database, a source pluggable database that is currently at a source container database. The destination container database is distinct from the source container database when the source container database is managed separately from the destination container database and the two container databases do not share storage.

As an example of an instruction to move a PDB between CDBs, database server instance 142 (in a database configuration as depicted in FIG. 2A) receives an instruction to move PDB 214 from CDB 210 to CDB 230. CDB 210 is distinct from CDB 230 in that CDB 210 is maintained separately from (and/or does not share resources with) CDB 230. According to one or more embodiments, receiving the instruction to move the pluggable database triggers creating a functionally-equivalent copy of PDB 214 on CDB 230 (as described in connection with flowchart 500 and depicted in FIG. 2C) such that creating a functionally-equivalent copy of PDB 214 on CDB 230 is performed in response to receiving the instruction to move the pluggable database.

Migrating Connections to the PDB Functionally-Equivalent Copy in the Destination CDB Migrating connections from a source PDB to a functionally-equivalent copy of the source PDB at the destination CDB should be managed in order to minimize issues such as logon storms and periods of time where the PDB is not available for connections at all. Herein, a connection to a PDB, or a connection for accessing a PDB, is a connection to a database session configured for accessing the PDB. At times, a functionally-equivalent copy of the source PDB is referred to herein as an "FE copy".

When a particular pluggable database is being moved from a source CDB to a destination CDB, in order to provide as much time as possible for connections to migrate from the particular PDB (which is slated to be taken offline) at the source CDB to the clone of the particular PDB at the destination CDB, embodiments open the PDB clone (which may represent a functionally-equivalent copy of the particular PDB) at the destination CDB to new connections as soon as possible. According to one or more embodiments, a connections migrates from a first CDB to a second CDB when a connection to the first CDB is terminated and a new connection is initiated with the second CDB, where the new connection to the second CDB is used in place of the connection with the first CDB.

Thus, according to one or more embodiments, once the first round of recovery (as described in step 510 of flowchart 500) has been performed on the PDB clone at the destination CDB, the PDB clone is configured to accept connections and process transactions in read-only mode. Opening the PDB clone up to accept connection requests initiates migration of connections from the source PDB to the PDB clone (before the PDB clone is an FE copy).

According to one embodiment, the instance that manages the PDB clone immediately processes queries issued through such connections. In this embodiment, because the first round of recovery is insufficient to make the PDB clone functionally-equivalent to the source PDB, queries running on the PDB clone prior to finishing the second round of recovery will provide information that is behind the data in the source PDB ("stale data"). However, at times, the possibility of users receiving stale information from the PDB clone is balanced by the benefit of providing early access to data within the PDB clone.

However, at times, returning stale data in query results is not acceptable. In such situations, and according to another embodiment, the instance that manages the PDB clone does not process queries over the PDB clone before the second round of recovery is complete. In this embodiment, queries issued over connections to the PDB clone that are received prior to completion of the second round of recovery are placed on hold (as described herein) until the second round of recovery is complete. Once the second round of recovery is complete (and the PDB clone is now a PDB FE copy), the instance processes the issued queries over the fully-updated PDB FE copy.

To illustrate making the PDB clone available for new connections, after the first round of recovery is performed on PDB clone 236, instance 152 registers connection information for PDB clone 236 with database listener 154. This registration information allows database listener 154 to process user requests for connections to PDB clone 236. A database listener is a process that runs on a server device, and may be part of a connection manager, as described above. A database listener receives incoming client connection requests and manages the traffic of those requests. After receiving the registration information, database listener 154 receives one or more requests for connections to PDB clone 236 and, in response, provides connections to PDB clone 236. Database server instance 152 begins processing read operations, received via those connections, on PDB clone 236.

While PDB clone 236 is in read-only mode, any attempts to perform a write operation on the PDB clone cannot be processed. Generally, write requests on a PDB in read-only mode would result in an error being returned to the requester of the write operation. According to one or more embodiments, instead of returning an error when a user attempts performance of a write operation on PDB clone 236 while the clone is in read-only mode, database server instance 152 puts the write operation on hold until PDB clone 236 is available to process write operations. According to an embodiment, instance 152 puts an operation on hold by placing a database session, to which a request for the operation was issued, in an intermediate or "sleep" mode and not responding to the operation request (either by processing the operation or by returning an error message) while the session is in sleep mode. Once a given type of operation is able to be processed over PDB clone 236, instance 152 cycles through all sessions that are in sleep mode because of request operations of that type and instance 152 removes these sessions from sleep mode (unless there is an additional reason why the session is in sleep mode). Once the session is removed from sleep mode, instance 152 processes the operations requested via the database session as if the requests were just received.

Closing Connections at the Source Pluggable Database

Because the data in PDB 214 is being moved away from CDB 210, the connections to PDB 214 in CDB 210 are closed. According to one or more embodiments, database server instance 142 gradually closes the connections to PDB 214 over a period of time to allow the users of those connections to gradually request new connections with PDB clone 236 at the destination location. If database server instance 142 were to terminate all connections to PDB 214 at once (or over a very short period of time) the users of those terminated connections would submit new connection requests to PDB clone 236 at substantially the same time causing an undesirable "logon storm". Given that allocating a new connection to a PDB is an expensive task, processing a wave of new connection requests for PDB clone 236 would tax the resources of database server instance 152 and potentially degrade service performed by that instance.

According to an embodiment, once PDB 214 (operating in read-only mode) is closed to new connection requests, instance 142 begins closing previously-established connections to PDB 214. According to another embodiment, instance 142 begins closing connections to PDB 214 (operating in read-only mode) in response to instance 142 receiving a message, from instance 152, indicating that PDB clone 236 has been placed in read-write mode.

To avoid occurrence of a logon storm, instance 142 gradually closes the connections to PDB 214. According to one or more embodiments, instance 142 closes the connections to PDB 214 based on a particular closure rate. The closure rate at which instance 142 closes connections to PDB 214 may be a default rate, may be based on information received from a user that defines a connection closure rate, or may be calculated based on information about PDB 214 (such as a number of connections that are currently open with PDB 214, etc.).

According to an embodiment, database server instance 142 identifies the connection closure rate in data for the command to move PDB 214. For example, the connection closure rate is provided, by the database user, as an argument to the command. To illustrate, a user indicates, via an argument to the instruction to move PDB 214, that the connections to PDB 214 should all be closed in ten minutes from the time that instance 142 initiates closure of the connections to PDB 214. Based on the number of connections to PDB 214, database server instance 142 calculates a connection closure rate such that, when connections are closed at the calculated rate, all connections are closed within the given amount of time.

According to another embodiment, the connection closure rate is a default rate of connection closures, information for which is accessible by database server instance 142. The connection closure rate may be in the form of an amount of time over which PDB connections should be closed, or in the form of a rate of connections per unit time at which PDB connections should be closed.

According to another embodiment, instance 142 automatically determines the connection closure rate based, at least in part, on statistics maintained for at least one of: the source PDB 214, PDB clone 236, database 160, database 170, CDB 210, CDB 230, instance 142, or instance 152. For example, these statistics comprise one or more of: a historical rate of connection initiation requests for PDB clone 236; the number of connections to PDB 214 maintained by instance 142 at the time that the instruction to move PDB 214 is received; the size of the data stored for PDB 214 in CDB 210; a rate of query execution on the instance 152; one or more transaction rates for PDB 214 at instance 142 or for PDB clone 236 at instance 152; a measure of processing power of database server instance 152; etc.

For example, instance 142 calculates the connection closure rate based on the rate of transactions for PDB 214 processed by instance 142. Calculation of the connection closure rate may be based on mapping data that maps closure rates to set thresholds for transaction rates. According to one or more embodiments, based on the mapping data, instance 142 causes connection closures to be performed more quickly when there is a lower transaction rate for the source PDB at the source instance.

To illustrate, instance 142 determines that the rate of transactions for PDB 214 (i.e., at instance 142) is below a first threshold (e.g., where the first threshold is one transaction per second). In response, instance 142 sets the connection closure rate, for closing connections to PDB 214, at a closure rate that is mapped, in mapping data, to transaction rates less than the first threshold (e.g., closing ten connections per minute).

As a further illustration, instance 142 determines that the rate of transactions for PDB 214 in instance 142 is above the first threshold and below a second threshold (that is higher than the first threshold, e.g., where the second threshold is five transactions per second). In response, instance 142 sets the connection closure rate, for closing connections to PDB 214, at a closure rate that is mapped, in mapping data, to transaction rates greater than the first threshold and less than the second threshold (e.g., closing six connections per minute).

As yet further illustration, instance 142 determines that rate of transactions for PDB 214 in instance 142 is above the second threshold. In response, instance 142 sets the connection closure rate, for closing connections to PDB 214, at a closure rate that is mapped, in mapping data, to transaction rates greater than the second threshold (e.g., closing two connections per minute).

According to one or more embodiments, instance 142 determines the connection closure rate based on an amount of time over which the connections to the subject PDB are to be gradually closed. Based on an amount of time over which the connections are to be closed, instance 142 determines the connection closure rate to be one or more of: a single steady rate based on which all connections to PDB 214 will be closed in the specified amount of time; a number of groups of connections, to PDB 214, to be closed at automatically-determined intervals over the specified amount of time; two or more different connection closure rates to be used during the specified amount of time in order to close all connections to PDB 214 in the specified amount of time; etc.

Instance 142 closes the connections to PDB 214 either forcefully or gracefully. To illustrate, an instance gracefully closes a connection by coordinating termination, of operations initiated via the connection, with users that requested the operations thereby allowing the users to perform termination processing prior to the connection closure. An instance forcefully closes a connection by, for example, forcing immediate termination of operations initiated via the connection, i.e., without allowing further processing to be performed on those operations.

Preparing the PDB Clone for the Second Round of Recovery

According to one or more embodiments, instance 152 does not allow any operations (read or write) to be processed over data in PDB clone 236 while the second round of recovery is being performed on PDB clone 236 (described in connection with step 516 of flowchart 500). For example, instance 152 disallows operations to be performed on PDB clone 236 by putting all operation requests for data in PDB clone 236 on hold (as described above) for the duration of the second round of recovery.

Nevertheless, database server instance 152 does not close any connection that has been made to PDB clone 236 while the second round of recovery is being performed on PDB clone 236. According to an embodiment, new connections may not be made with PDB clone 236 while operations are disallowed. According to another embodiment, instance 152 accepts new connections requests, to connect to PDB clone 236, while operations on PDB clone 236 are disallowed. For example, instance 152 puts new connection requests to connect to PDB clone 236 on hold (as described above) while the second round of recovery is being performed on PDB clone 236.

PDB Data Availability

According to one or more embodiments, the PDB data being moved is made unavailable to the user for a minimal amount of time. To illustrate, during a moving operation that moves the data of a PDB from a source PDB at a source CDB to a PDB clone at a destination CDB, the source PDB is available for read and write operations throughout copying the files of the source PDB to the PDB clone and is also available for read and write operations while gathering redo information for the first round of redo on the PDB clone. Before the source instance stops accepting connection requests for the source PDB, the PDB clone is made available for new connections and, depending on the tolerance for "stale" data as described above, to read-only operations.

Nevertheless, the source PDB is available for read and write operations until just before the second batch of redo information is collected in preparation for making the PDB clone a functionally-equivalent copy of the source PDB. According to one or more embodiments, while the second batch of redo information is being collected, the PDB clone is available for read-only operations, as described in further detail above. For the amount of time that it takes to actually perform the second round of recovery on the PDB clone, the data in the PDB clone is completely unavailable for operations thereon, though, according to one or more embodiments, the PDB clone still accepts new connection requests. According to an embodiment, the source PDB is also unavailable for any read or write operations while the second round of recovery is being performed. However, the time it takes to perform the second round of recovery is relatively short compared to the time it takes to perform all other steps to make a functionally-equivalent copy of the source PDB.

Figure 2D:
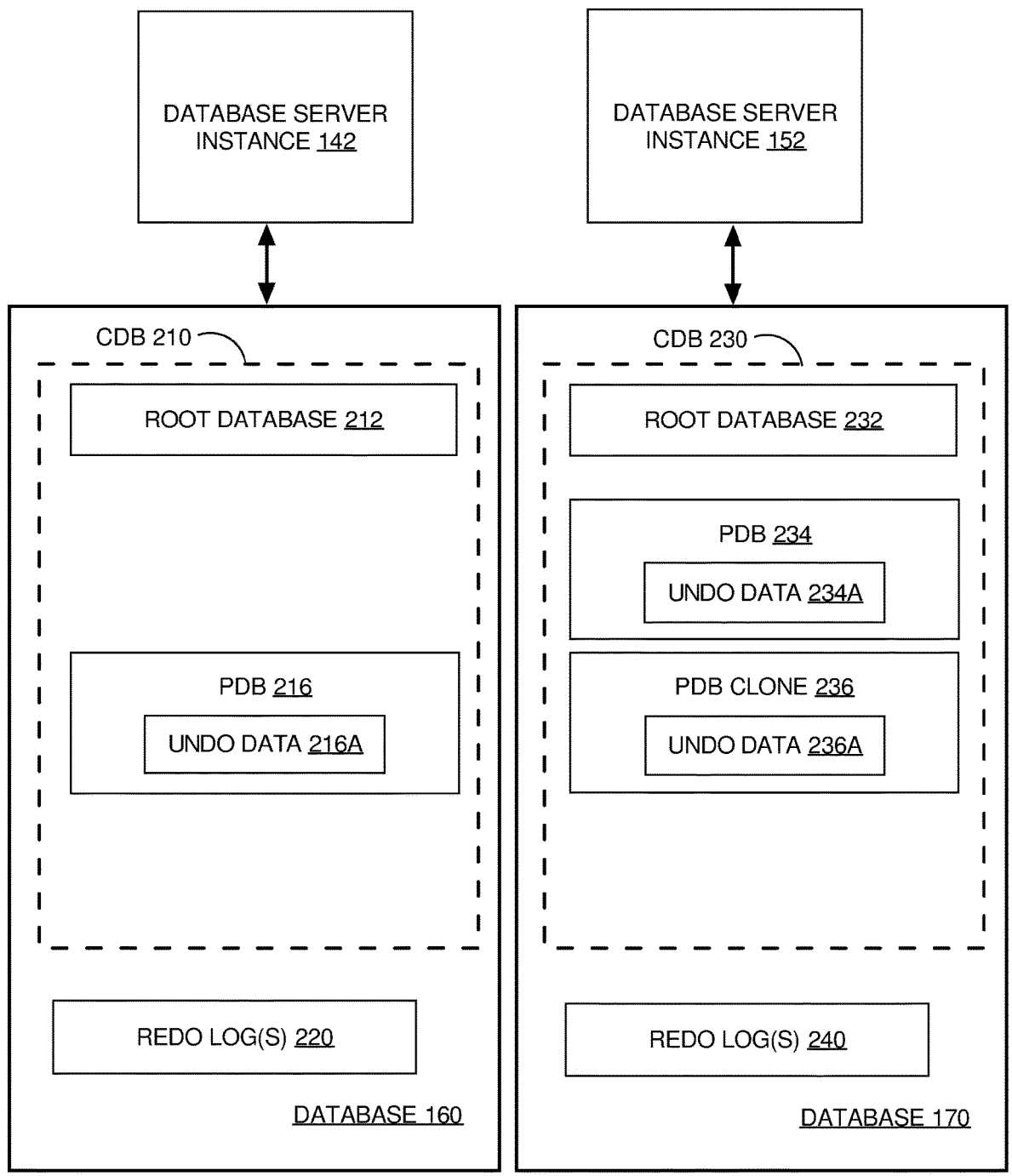

Once the PDB clone is a functionally-equivalent copy of the source PDB, the PDB FE copyis made available for all kinds of requests, including write requests. According to an embodiment in which PDB 214 is being moved (i.e., from CDB 210 to CDB 230), instance 152 sends a message to instance 142 that the functionally-equivalent copy operation is successfully completed and that PDB 214 should be deleted. In response to receiving this message, instance 142 deletes PDB 214 from CDB 210, as depicted in FIG. 2D. In the case that connection requests to PDB 214 are transparently forwarded to PDB clone 236 (now an FE copy), deletion of PDB 214 leaves behind a tombstone with information for PDB 214 as described in further detail below Transparent Forwarding of Connections After a pluggable database is moved from a source container database to a destination container database, users that previously connected to the pluggable database at the source container database will not be able to continue accessing the pluggable database data in the same way. Changing how users connect to the moved pluggable database data generally requires adjusting connection information (e.g., connection strings in configuration files) across many user configurations used to access the pluggable database. Adjusting all information so that users may connect to the moved pluggable database without error can be an onerous, mistake-prone, and protracted task.

To illustrate, a particular user connects to a particular pluggable database (PDB 214) via a connection service, such as database listener 144. The database listener is configured to provide connections to the particular pluggable database. In this example, the user accesses the connection service based on a connection string, hard-coded into a configuration file, that includes an address of the host of the database listener and also a port number at which the database listener is listening.

While the particular user still requires access to PDB 214, PDB 214 is moved to a different container database than that which originally contained the pluggable database (i.e., from CDB 210 to CDB 230). Because PDB 214 is being removed from CDB 210, the connection that the user was using to access PDB 214 is terminated.

According to one or more embodiments, at the time when source PDB 214 ceases processing write operations, as described in connection with step 512 of flowchart 500, database server instance 142 also closes PDB 214 to new connection requests. For example, database server instance 142 informs database listener 144, at server device 140, that PDB 214 is no longer accepting new connections. In response to receiving this information, listener 144 removes registration information, from a register for listener 144, that indicates that PDB 214 is available for new connections. After receiving the information that PDB 214 is not open to new connections, database listener 144 receives one or more connection requests to connect to PDB 214. Listener 144 queries its registry for registration information for PDB 214 and, finding no registration information for PDB 214 (which indicates that listener 144 is not configured to provide new connections for PDB 214), returns error messages in response to the one or more connection requests and does not provide new connections to PDB 214.

Returning to the example of termination of a connection that a user was using to access PDB 214 because PDB 214 has moved, after PDB 214 is moved from CDB 210, the user utilizes the connection string to request, from database listener 144, a new connection to PDB 214. However, database listener 144 can no longer provide connections to PDB 214 because the PDB has been moved from CDB 210, which is the container database that listener 144 serves. As such, instead of returning connection information, database listener 144 returns an error message to the requesting user as described above.

Without transparent forwarding of requests for new connections to PDB 214, all of the connection strings for any user that needs to connect to PDB 214 must be updated with the new address of the new host and also potentially with the new port number for the database listener that now serves connections to PDB 214 at its new location.

As such, to facilitate a smooth transition of PDB data from a source container database to a destination container database, according to one or more embodiments, connection requests sent to the previous location of a moved PDB are transparently forwarded to the new location of the PDB. The forwarded connection requests are received at the new location and the requesting users are provided with connections to the moved PDB. More specifically, connection requests received by a connection service that served connections for a moved PDB (at its previous location) are automatically forwarded to a connection service that serves connections to the PDB at its new location. The connection service at the new location processes the new connection requests as if the requests were originally sent thereto.

Figure 6:
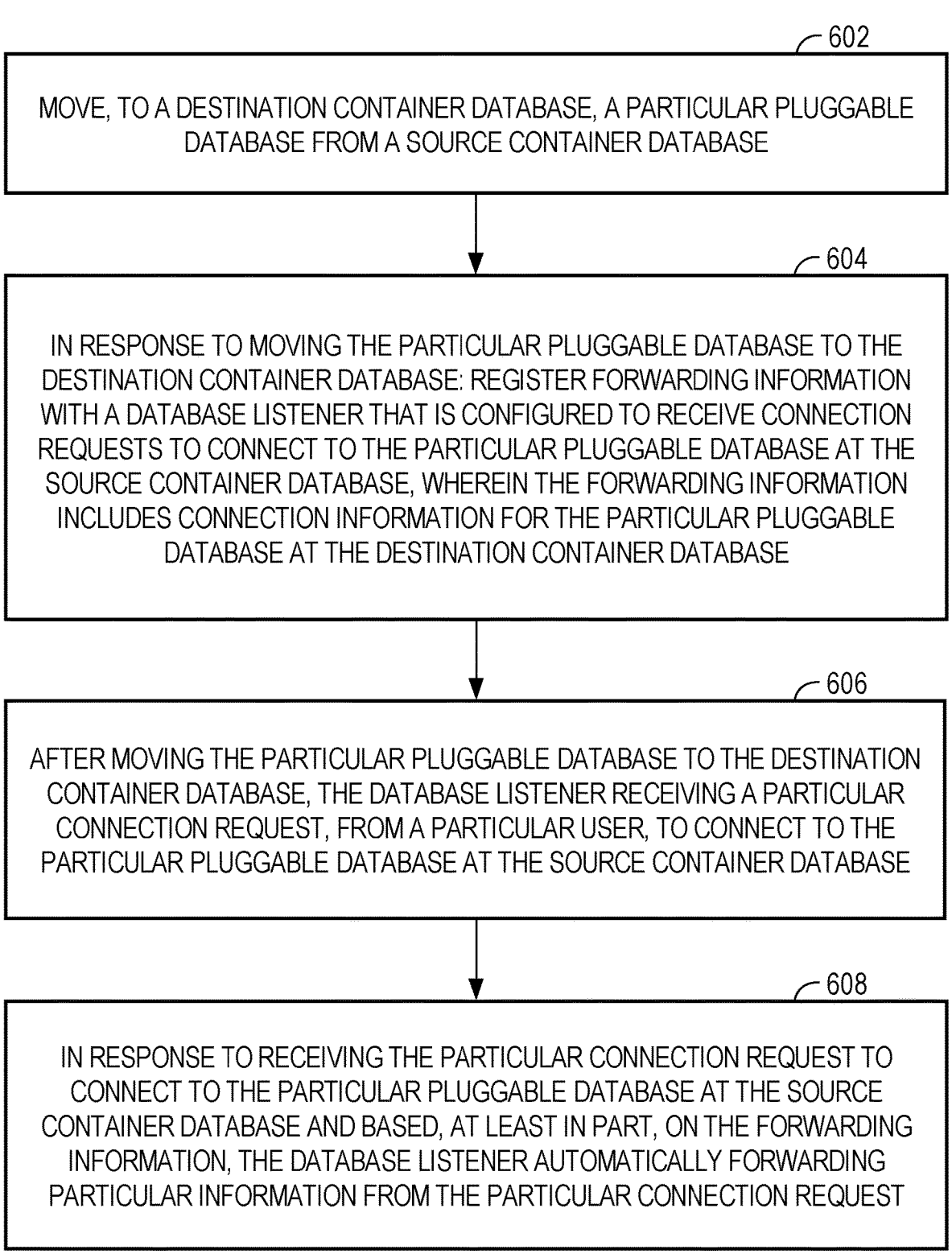
FIG. 6 depicts a flowchart for transparently forwarding connection requests that request new connections to a pluggable database that has been moved from a source location to a destination location.

Transparently forwarding of connection requests greatly increases the availability of the relocated pluggable database in that users may continue to successfully request connections to the pluggable database (at the new location) using connection information that refers to the source location. FIG. 6 depicts a flowchart 600 for transparently forwarding connection requests that request new connections to a pluggable database that has been moved from a source location to a destination location.

At step 602, a particular pluggable database is moved from a source container database to a destination container database. For example, database server instances 142 and 152 coordinate moving the data from PDB 214 in CDB 210 to PDB clone 236 in CDB 230, as described above in connection with flowchart 500. CDB 210 is distinct from CDB 230.

At step 604, in response to moving the particular pluggable database to the destination container database, forwarding information is registered with a database listener that is configured to receive connection requests to connect to the particular pluggable database at the source container database, wherein the forwarding information includes connection information for the particular pluggable database at the destination container database. For example, instance 152 configures database listener 154 to provide connections to PDB clone 236 upon request. Instance 152 causes forwarding information (identifying database listener 154) to be registered with database listener 144 running at server device 140. For example, registering forwarding information with database listener 144 comprises including the forwarding information as a registry entry in a registry for database listener 144. Database listener 144 is the listener which, prior to moving PDB 214 from CDB 210, provided new connections to PDB 214 on CDB 210.

According to one or more embodiments, instance 152 may send forwarding information to instance 142 for registration with database listener 144 at any time after PDB clone 236 is available for connections via listener 154. For example, instance 152 sends the forwarding information to be registered with database listener 144 once PDB clone 236 is fully functional and instance 152 has registered connection information for PDB clone 236 with database listener 154. Based on the connection information, database listener 154 may provide new connections in response to received requests for new connections to PDB clone 236 and, as such, is prepared to receive forwarded connection requests.

The forwarding information includes details that are needed for listener 144 to be able to forward connection requests to listener 154. For example, the forwarding information includes a host address identifying server device 150 and also a port number identifying a port on server device 150 at which listener 154 (now configured to process connection requests for PDB clone 236) is listening.

At step 606, after moving the particular pluggable database to the destination container database, the database listener receives a particular connection request, from a particular user, to connect to the particular pluggable database at the source container database. For example, after PDB 214 has been moved from CDB 210, database listener 144 receives a new connection request, from a particular user via database client 112, to connect to PDB 214 at CDB 210.

At step 608, in response to receiving the particular connection request to connect to the particular pluggable database at the source container database and based, at least in part, on the forwarding information, the database listener automatically forwards particular information from the particular connection request. For example, based on information in the new connection request from the particular user, database listener 144 determines that the new connection request is a request to connect to PDB 214 at CDB 210. Database listener 144 searches the information, registered therewith, for registration information associated with PDB 214 as indicated in the request. Based on that search, listener 144 identifies the forwarding information for PDB 214.

In response to determining that the registration information for PDB 214 is forwarding information, listener 144 causes creation of a transformed new connection request based on (a) the received new connection request, and (b) the mapping data stored in the forwarding information registry record. Specifically, listener 144 causes the new transformed connection request include the identifier of PDB clone 236 (instead of the identifier of source PDB 214) as indicated in the mapping data. Data identifying the requesting user remains unchanged from the original connection request and the transformed connection request.

Database listener 144 causes the transformed new connection request to be forwarded to database listener 154 using the information identifying the location of listener 154 included in the forwarding registration information registered with listener 144.

In response to receiving the forwarded new connection request, database listener 154 processes the new connection request, based on the information in the forwarded message, as if the request had originally been sent to listener 154. Specifically, upon receiving the new connection request, database listener 154 determines that the request is to connect to PDB clone 236 based on information included in the request. Database listener 154 searches the information registered therewith to identify registration information associated with PDB clone 236.

The results of that search indicate that connection information for PDB clone 236 is registered with listener 154. In response to determining that the registration information is connection information, listener 154 provides, to the user that originally sent the request to listener 144, a new connection to PDB clone 236 at CDB 230. Thus, database listener 144 transparently forwards new connection requests, submitted to listener 144, to database listener 154, which is capable of connecting the requesting user to the PDB that has moved without the requesting user having to update how the user connects to the PDB.

According to one or more embodiments, when database listener 144 forwards a new connection request based on forwarding registration information, database listener 144 also causes a message to be sent to the requesting user informing the user that the connection request was forwarded. Such message may include information from the forwarding registration, such as connection information for listener 154.

According to one or more embodiments, forwarding registration information is automatically registered with listener 144 when PDB 214 is moved from CDB 210 to CDB 230 as described above. According to another embodiment, the forwarding registration information is registered with listener 144 in response to receiving a request to register the forwarding registration information with listener 144.

Also, according to one or more embodiments, after registering the forwarding information with listener 144, database server instance 142 creates a tombstone record in CDB 210 with the information for PDB 214. Presence of the tombstone record automatically prevents new PDBs from being created in CDB 210 with the same identifying information as PDB 214, since a new PDB with the same identifying information as PDB 214 would create confusion as to which new connection requests should be forwarded to listener 154 and which should cause a connection to be created to the new PDB with the same identifying information.

According to one or more embodiments, database server instance 142 is configured to receive requests to cease forwarding connection requests for PDB 214 at CDB 210. For example, an administrator may cease forwarding connection requests once the administrator has updated all hard-coded connection strings with the new connection information for a moved PDB, at which point forwarding is no longer needed. Ceasing forwarding connection requests eliminates any overhead inherent in transparent forwarding. In response to receiving a cease forwarding request, database server instance 142 de-registers, from listener 144, the forwarding information that causes listener 144 to forward new connection requests, that request a new connection to PDB 214 at CDB 210, to listener 154. For example, de-registering the forwarding information comprises deleting forwarding registration information, from the registry of listener 144, which information was produced by registering the forwarding information for PDB 214. Furthermore, receiving the request to cease forwarding causes database server instance 142 to remove any tombstone record with information for PDB 214.

In some cases, the source and destination CDBs for a moved PDB are both served by a listener that has access to connection information for both CDBs (such that the listener acts as a router for connection requests for both CDBs). In these cases, registration information for the listener is updated when a PDB moves from the source to the destination CDB, and the listener automatically routes connection requests for the moved PDB to the new location of the PDB without the need for transparent forwarding.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
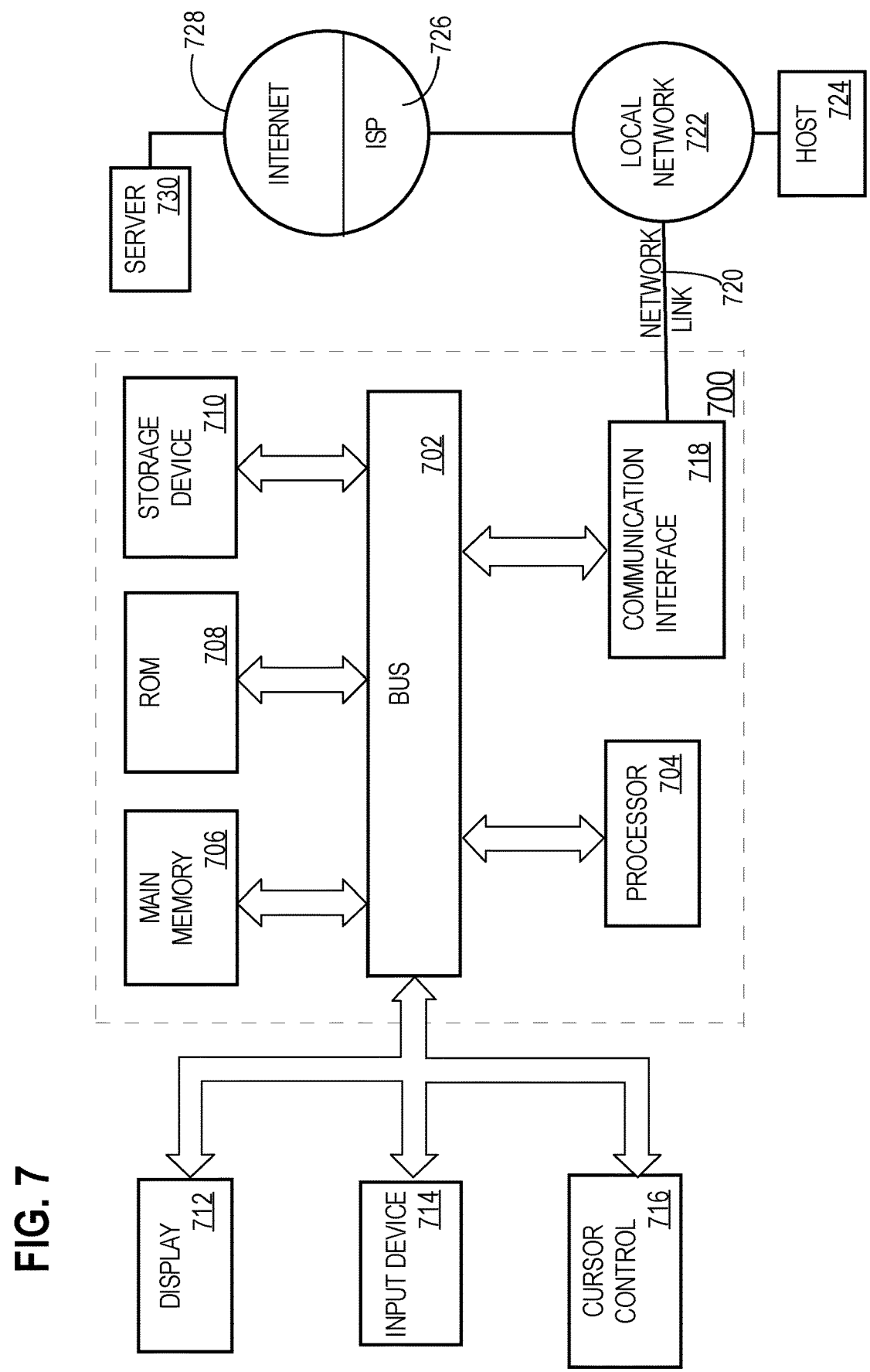
FIG. 7 is a block diagram of a computer system on which embodiments may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
    moving, to a destination container database, a particular pluggable database from a source container database;
    wherein the destination container database is distinct from the source container database;
    in response to moving the particular pluggable database to the destination container database:
        registering forwarding information with a database listener that is configured to receive connection requests to connect to the particular pluggable database at the source container database,
        wherein the forwarding information includes connection information for the particular pluggable database at the destination container database;
    after moving the particular pluggable database to the destination container database, the database listener receiving a particular connection request, from a particular user, to connect to the particular pluggable database at the source container database; and
    in response to receiving the particular connection request to connect to the particular pluggable database at the source container database and based, at least in part, on the forwarding information, the database listener automatically forwarding, to the destination container database, particular information from the particular connection request;
    wherein the method is performed by one or more computing devices.

2. The method of claim 1, wherein:
    the forwarding information includes a host address and a port number; and
    the database listener automatically forwarding the particular information from the particular connection request comprises forwarding the particular information from the particular connection request to the port number on a host addressed by the host address.

3. The method of claim 1, wherein:
    the database listener is a first database listener; and
    the first database listener automatically forwarding the particular information from the particular connection request comprises forwarding the particular information from the particular connection request to a second database listener that is configured to receive connection requests to connect to the particular pluggable database at the destination container database.

4. The method of claim 3, further comprising the second database listener:
    receiving the information from the particular connection request that was sent by the first database listener; and
    in response to receiving the information from the particular connection request, automatically providing, to the particular user, a connection to the particular pluggable database at the destination container database.

5. The method of claim 1, further comprising, after registering the forwarding information with the database listener that is configured to receive connection requests to connect to the particular pluggable database at the source container database:
    creating a tombstone record that records an identifier of the particular pluggable database; and
    based, at least in part, on the tombstone record, preventing a second pluggable database, that is in the source container database, from being assigned the identifier of the particular pluggable database.

6. The method of claim 1, further comprising:
    wherein the forwarding information includes at least a target identifier that identifies the particular pluggable database at the destination container database;
    wherein registering the forwarding information comprises storing mapping data that maps the target identifier to a source identifier that identifies the particular pluggable database at the source container database; and in response to receiving the particular connection request and before the database listener automatically forwarding the particular information from the particular connection request: the database listener automatically transforming the particular connection request, based on the mapping data, to produce a transformed connection request;

wherein the database listener automatically forwarding the particular information from the particular connection request comprises the database listener automatically forwarding the transformed connection request;

wherein the particular connection request includes the source identifier; and wherein the transformed connection request includes the target identifier.

7. The method of claim 1, wherein:

registering the forwarding information with the database listener comprises including the forwarding information in a registry for the database listener;

the method further comprises:
   receiving a request to cease forwarding connection requests; and
   in response to receiving the request to cease forwarding connection requests, deleting the forwarding information from the registry.

8. One or more non-transitory computer-readable media storing one or more sequences of instructions that, when executed by one or more processors, cause:

moving, to a destination container database, a particular pluggable database from a source container database;

wherein the destination container database is distinct from the source container database;

in response to moving the particular pluggable database to the destination container database:
   registering forwarding information with a database listener that is configured to receive connection requests to connect to the particular pluggable database at the source container database,
   wherein the forwarding information includes connection information for the particular pluggable database at the destination container database;

after moving the particular pluggable database to the destination container database, the database listener receiving a particular connection request, from a particular user, to connect to the particular pluggable database at the source container database; and in response to receiving the particular connection request to connect to the particular pluggable database at the source container database and based, at least in part, on the forwarding information, the database listener automatically forwarding, to the destination container database, particular information from the particular connection request.

9. The one or more non-transitory computer-readable media of claim 8, wherein:

the forwarding information includes a host address and a port number; and the database listener automatically forwarding the particular information from the particular connection request comprises forwarding the particular information from the particular connection request to the port number on a host addressed by the host address.

10. The one or more non-transitory computer-readable media of claim 8, wherein:

the database listener is a first database listener; and the first database listener automatically forwarding the particular information from the particular connection request comprises forwarding the particular information from the particular connection request to a second database listener that is configured to receive connection requests to connect to the particular pluggable database at the destination container database.

11. The one or more non-transitory computer-readable media of claim 10, wherein the one or more sequences of instructions further comprise instructions that, when executed by one or more processors, cause the second database listener:

receiving the information from the particular connection request that was sent by the first database listener; and in response to receiving the information from the particular connection request, automatically providing, to the particular user, a connection to the particular pluggable database at the destination container database.

12. The one or more non-transitory computer-readable media of claim 8, wherein the one or more sequences of instructions further comprise instructions that, when executed by one or more processors, cause, after registering the forwarding information with the database listener that is configured to receive connection requests to connect to the particular pluggable database at the source container database:

creating a tombstone record that records an identifier of the particular pluggable database; and based, at least in part, on the tombstone record, preventing a second pluggable database, that is in the source container database, from being assigned the identifier of the particular pluggable database.

13. The one or more non-transitory computer-readable media of claim 8, wherein the one or more sequences of instructions further comprise instructions that, when executed by one or more processors, cause:

wherein the forwarding information includes at least a target identifier that identifies the particular pluggable database at the destination container database;

wherein registering the forwarding information comprises storing mapping data that maps the target identifier to a source identifier that identifies the particular pluggable database at the source container database; and in response to receiving the particular connection request and before the database listener automatically forwarding the particular information from the particular connection request: the database listener automatically transforming the particular connection request, based on the mapping data, to produce a transformed connection request;

wherein the database listener automatically forwarding the particular information from the particular connection request comprises the database listener automatically forwarding the transformed connection request;

wherein the particular connection request includes the source identifier; and wherein the transformed connection request includes the target identifier.

14. The one or more non-transitory computer-readable media of claim 8, wherein:

registering the forwarding information with the database listener comprises including the forwarding information in a registry for the database listener; and the one or more sequences of instructions further comprise instructions that, when executed by one or more processors, cause:
   receiving a request to cease forwarding connection requests; and in response to receiving the request to cease forwarding connection requests, deleting the forwarding information from the registry.

\* \* \* \* \*